United States Patent
Jung et al.

(10) Patent No.: US 11,917,187 B2
(45) Date of Patent: *Feb. 27, 2024

(54) VIDEO SIGNAL PROCESSING METHOD AND DEVICE USING MOTION COMPENSATION

(71) Applicant: HUMAX CO., LTD., Yongin-si (KR)

(72) Inventors: Jaehong Jung, Seoul (KR); Dongcheol Kim, Suwon-si Gyeonggi-do (KR); Geonjung Ko, Seoul (KR); Juhyung Son, Uiwang-si Gyeonggi-do (KR); Jinsam Kwak, Anyang-si Gyeonggi-do (KR)

(73) Assignee: HUMAX CO., LTD., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/146,227

(22) Filed: Dec. 23, 2022

(65) Prior Publication Data
US 2023/0129632 A1 Apr. 27, 2023

Related U.S. Application Data

(63) Continuation of application No. 17/314,373, filed on May 7, 2021, now Pat. No. 11,575,927, which is a
(Continued)

(30) Foreign Application Priority Data

Mar. 27, 2018 (KR) .................. 10-2018-0035474
Mar. 29, 2018 (KR) .................. 10-2018-0036917
(Continued)

(51) Int. Cl.
*H04N 19/513* (2014.01)
*H04N 19/105* (2014.01)
(Continued)

(52) U.S. Cl.
CPC ......... *H04N 19/513* (2014.11); *H04N 19/105* (2014.11); *H04N 19/132* (2014.11); *H04N 19/137* (2014.11); *H04N 19/176* (2014.11)

(58) Field of Classification Search
CPC .... H04N 19/503; H04N 19/51; H04N 19/513; H04N 19/52
See application file for complete search history.

(56) References Cited

U.S. PATENT DOCUMENTS

| 11,039,162 B2 | 6/2021 | Jung et al. |
| 2003/0099294 A1* | 5/2003 | Wang .................. H04N 19/112 375/E7.262 |

(Continued)

FOREIGN PATENT DOCUMENTS

| CN | 103370940 A | 10/2013 |
| KR | 1020110113583 A | 10/2011 |

(Continued)

OTHER PUBLICATIONS

International Search Report & Written Opinion of the International Searching AUTHORIITY_PCT/KR2019/003608_ dated Jul. 9, 2019.
(Continued)

*Primary Examiner* — Jeremiah C Hallenbeck-Huber

(57) ABSTRACT

Disclosed is a video signal processing method comprising the steps of: acquiring a merge index which indicates a candidate for prediction of a current block among a plurality of candidates for the prediction of the current block, which are included in a merge candidate list; acquiring motion information of the current block on the basis of motion information corresponding to the candidate indicated by the merge index; when the motion information of the current block includes a plurality of motion vectors corresponding to a list of different reference pictures, comparing picture order count (POC) differences between each of the reference pictures corresponding to the plurality of motion vectors and
(Continued)

the current picture including the current block; correcting the plurality of motion vectors on the basis of a result of the comparison; and reconstructing the current block on the basis of the plurality of corrected motion vectors.

18 Claims, 20 Drawing Sheets

Related U.S. Application Data continuation of application No. 17/033,723, filed on Sep. 26, 2020, now Pat. No. 11,039,162, which is a continuation of application No. PCT/KR2019/003608, filed on Mar. 27, 2019.

(30) Foreign Application Priority Data

Apr. 12, 2018 (KR) .......................... 10-2018-0042844
Apr. 20, 2018 (KR) .......................... 10-2018-0046324

(51) Int. Cl.
*H04N 19/132* (2014.01)
*H04N 19/137* (2014.01)
*H04N 19/176* (2014.01)

(56) References Cited

U.S. PATENT DOCUMENTS

| | | | | |
|---|---|---|---|---|
| 2013/0279577 A1* | 10/2013 | Schwarz | ............. | H04N 19/184 375/240.12 |
| 2013/0294513 A1* | 11/2013 | Seregin | ................. | H04N 19/52 375/240.14 |
| 2014/0334551 A1* | 11/2014 | Kim | .................... | H04N 19/182 375/240.16 |
| 2016/0373688 A1* | 12/2016 | Imajo | ................... | H04N 19/176 |
| 2018/0098086 A1* | 4/2018 | Chuang | ................. | H04N 19/61 |
| 2019/0313112 A1* | 10/2019 | Han | ...................... | H04N 19/44 |

FOREIGN PATENT DOCUMENTS

| | | | |
|---|---|---|---|
| KR | 1020130002284 | A | 1/2013 |
| KR | 1020130101483 | A | 9/2013 |
| KR | 1020140005102 | A | 1/2014 |
| KR | 1020150024906 | A | 3/2015 |
| KR | 1020150138352 | A | 12/2015 |
| WO | 2015124110 | A1 | 8/2015 |
| WO | 2017039117 | A1 | 3/2017 |

OTHER PUBLICATIONS

Notice of Allowance of U.S. Appl. No. 17/033,723 from the USPTO dated Apr. 14, 2021.
Office Action of KR10-2020-7028082 from Korea Intellectual Property Office dated Jun. 9, 2021.
The Office Action from Intellectual Property Office of India for Application No. 202027043231 dated Sep. 16, 2021.
Non-Final Rejection of U.S. Appl. No. 17/033,723 from the USPTO dated Dec. 10, 2020.
"Request for the Submission of an Opinion" from KIPO (Korea Intellectual Property Office) for Application No. 10-2022-7002619 dated Dec. 5, 2022.
Non-Final Rejection of U.S. Appl. No. 17/314,373 from the USPTO dated May 10, 2022.
Notice of Allowance of U.S. Appl. No. 17/314,373 from the USPTO dated Sep. 20, 2022.
Hearing Notice in Reference of Application No. 202027043231 from Intellectual Property India; Applicant: Humax Co., Ltd. Date of Dispatch: Aug. 2, 2023.
Notice of Allowance for U.S. Appl. No. 18/146,227 dated Oct. 10, 2023.
Corrected Notice of Allowance for U.S. Appl. No. 18/146,227 dated Oct. 23, 2023.
Notification of First Office Action and Search Report for CN201980022660.0 from China National Intellectual Property Administration. dated Nov. 10, 2023.
Office Action for KR10-2023-7028220 from KIPO dated Dec. 12, 2023.

* cited by examiner

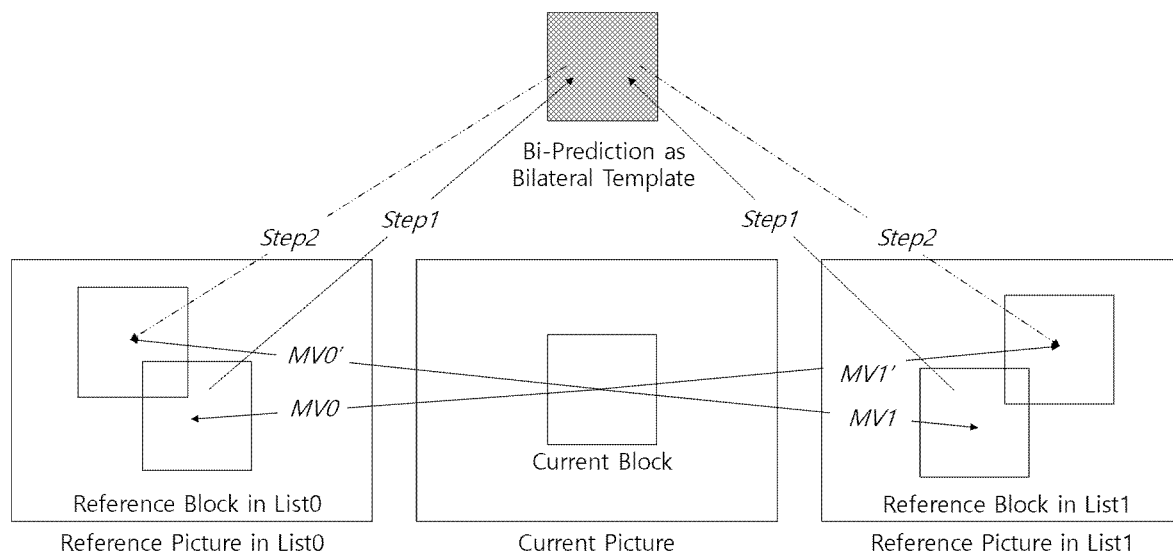
FIG. 13
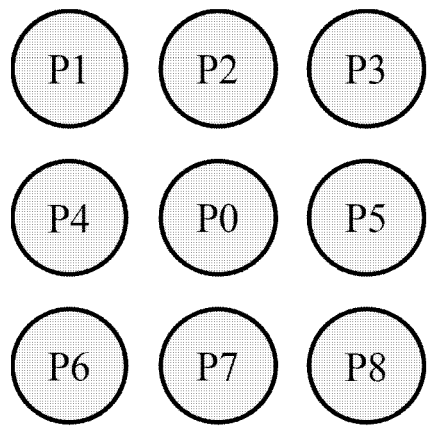
(a)
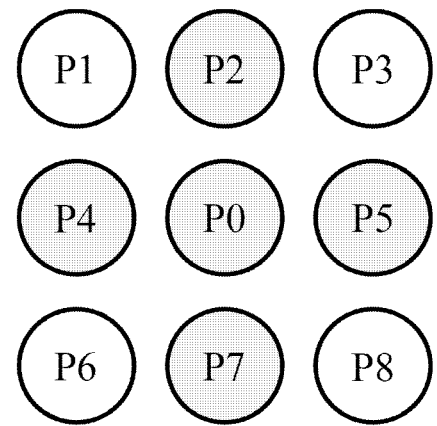
(b)
FIG. 14

$$P_{uni} = (w_0 \times P_0 + (w_{shift} \gg 1)) \gg w_{shift} + O_0$$

$$P_{bi} = (w_0 \times P_0 + w_1 \times P_1 + ((O_0 + O_1 + 1) \ll w_{shift})) \gg (w_{shift} + 1)$$

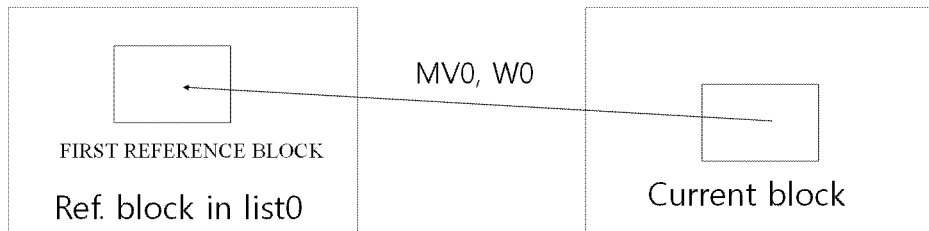
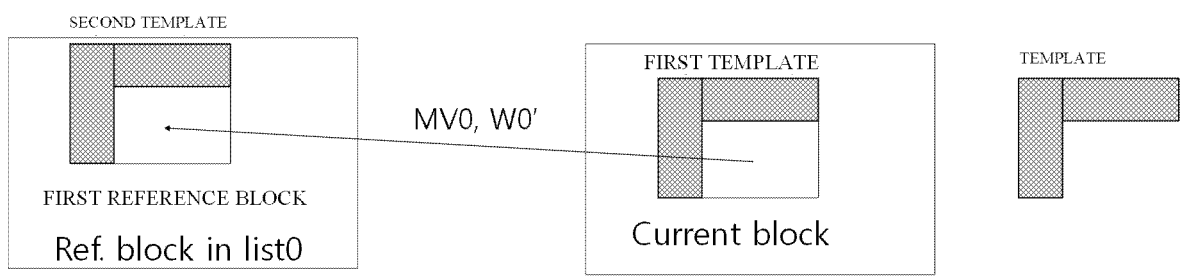
*FIG. 21*
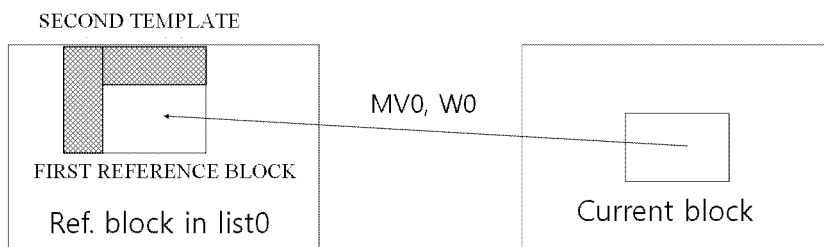
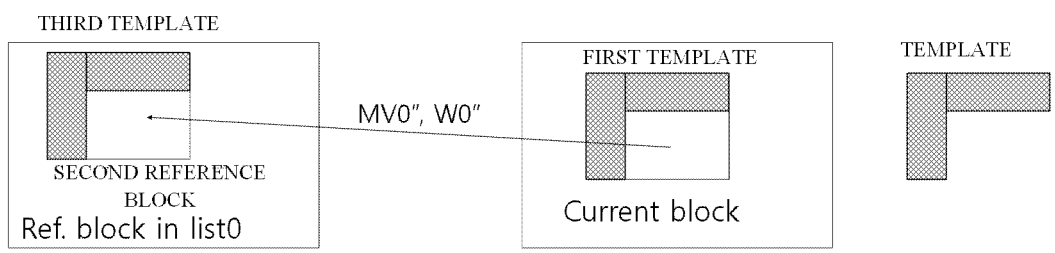
*FIG. 22*

| Smallest template cost position | Hit (0) | Vertical flip (10) | Horizontal flip (110) | Diagonal flip (111) |
|---|---|---|---|---|
| (++) | (++) | (+-) | (-+) | (--) |
| (+-) | (+-) | (++) | (--) | (-+) |
| (-+) | (-+) | (--) | (++) | (+-) |
| (--) | (--) | (-+) | (+-) | (++) |

*FIG. 27*

| Smallest template cost position | Hit (0) | Absolute value comparison | Small absolute value flip (10) | Diagonal flip (110) | Large absolute value flip (111) |
|---|---|---|---|---|---|
| (++) | (++) | $|x| < |y|$ | (-+) | (--) | (+-) |
|      |      | $|x| >= |y|$ | (+-) | (--) | (-+) |
| (+-) | (+-) | $|x| < |y|$ | (--) | (-+) | (++) |
|      |      | $|x| >= |y|$ | (++) | (-+) | (--) |
| (-+) | (-+) | $|x| < |y|$ | (++) | (+-) | (--) |
|      |      | $|x| >= |y|$ | (--) | (+-) | (++) |
| (--) | (--) | $|x| < |y|$ | (+-) | (++) | (-+) |
|      |      | $|x| >= |y|$ | (-+) | (++) | (+-) |

*FIG. 28*

| Smallest template cost position | Hit (0) | Absolute value comparison | Small absolute value flip (10) | Large absolute value flip (110) | Diagonal flip (111) |
|---|---|---|---|---|---|
| (++) | (++) | $|x| < |y|$ | (-+) | (+-) | (--) |
|      |      | $|x| >= |y|$ | (+-) | (-+) | (--) |
| (+-) | (+-) | $|x| < |y|$ | (--) | (++) | (-+) |
|      |      | $|x| >= |y|$ | (++) | (--) | (-+) |
| (-+) | (-+) | $|x| < |y|$ | (++) | (--) | (+-) |
|      |      | $|x| >= |y|$ | (--) | (++) | (+-) |
| (--) | (--) | $|x| < |y|$ | (+-) | (-+) | (++) |
|      |      | $|x| >= |y|$ | (-+) | (+-) | (++) |

*FIG. 29*

VIDEO SIGNAL PROCESSING METHOD AND DEVICE USING MOTION COMPENSATION

CROSS-REFERENCE TO RELATED APPLICATIONS

This application is a continuation of U.S. application Ser. No. 17/314,373, which was filed on May 7, 2021, and which is a continuation of U.S. application Ser. No. 17/033,723, which was filed on Sep. 26, 2020, now issued as U.S. Pat. No. 11,039,162 on Jun. 15, 2021, and which is a continuation of PCT International Application No. PCT/KR2019/003608, which was filed on Mar. 27, 2019, and which claims priority under 35 U.S.C 119(a) to Korean Patent Application No. 10-2018-0035474 filed with the Korean Intellectual Property Office on Mar. 27, 2018, Korean Patent Application No. 10-2018-0036917 filed with the Korean Intellectual Property Office on Mar. 29, 2018, Korean Patent Application No. 10-2018-0042844 filed with the Korean Intellectual Property Office on Apr. 12, 2018, and Korean Patent Application No. 10-2018-0046324 filed with the Korean Intellectual Property Office on Apr. 20, 2018. The disclosures of the above patent applications are incorporated herein by reference in their entirety.

TECHNICAL FIELD

The present invention relates to a video signal processing method and apparatus, and more particularly, to a video signal processing method and apparatus for encoding or decoding a video signal.

BACKGROUND ART

Compression coding refers to a series of signal processing techniques for transmitting digitized information through a communication line or storing information in a form suitable for a storage medium. An object of compression encoding includes objects such as voice, video, and text, and in particular, a technique for performing compression encoding on an image is referred to as video compression. Compression coding for a video signal is performed by removing excess information in consideration of spatial correlation, temporal correlation, and stochastic correlation. However, with the recent development of various media and data transmission media, a more efficient video signal processing method and apparatus are required.

DISCLOSURE OF THE INVENTION

Technical Problem

The present invention has an object to increase the coding efficiency of a video signal. In addition, the present invention has an object to increase signaling efficiency related to prediction of the current block using reference samples of the current block.

Technical Solution

To resolve the above problem, the present invention provides the following video signal processing device and video signal processing method.

According to an embodiment of the present invention, a video signal processing method includes the steps of: obtaining a merge index indicating a candidate for predicting a current block among a plurality of candidates included in a merge candidate list for predicting the current block; obtaining motion information about the current block on the basis of motion information corresponding to the candidate indicated by the merge index; comparing, when the motion information about the current block includes a plurality of motion vectors corresponding to different reference picture lists, a picture order count (POC) difference between each of reference pictures respectively corresponding to the plurality of motion vectors with a current picture including the current block; correcting the plurality of motion vectors on the basis of a result of the comparing; and reconstructing the current block on the basis of the plurality of corrected motion vectors.

Furthermore, according to an embodiment of the present invention, a video signal processing device includes a processor, wherein the processor obtains a merge index indicating a candidate for predicting a current block among a plurality of candidates included in a merge candidate list for predicting the current block, obtains motion information about the current block on the basis of motion information corresponding to the candidate indicated by the merge index, compares, when the motion information about the current block includes a plurality of motion vectors corresponding to different reference picture lists, a picture order count (POC) difference between each of reference pictures respectively corresponding to the plurality of motion vectors with a current picture including the current block, corrects the plurality of motion vectors on the basis of a result of the comparison, and reconstructs the current block on the basis of the plurality of corrected motion vectors.

The plurality of motion vectors may include a first motion vector and a second motion vector. The processor may obtain a first POC difference and a second POC difference, may compare the first POC difference with the second POC difference to obtain a specific offset that is a correction value of one of the first motion vector and the second motion vector, and may correct the first motion vector and the second motion vector on the basis of the specific offset. The first POC difference may indicate a POC difference between a first reference picture corresponding to the first motion vector and the current picture, and the second POC difference may indicate a POC difference between a second reference picture corresponding to the second motion vector and the current picture.

The processor may obtain the specific offset earlier than a correction value of the other one of the first motion vector and the second motion vector on the basis of a result of comparing the first POC difference with the second POC difference.

When the first POC difference is larger than the second POC difference, the specific offset may be the correction value of the first motion vector, and when the first POC difference is less than the second POC difference, the specific offset may be the correction value of the second motion vector.

When the first POC difference is larger than the second POC difference, the specific offset may be a first offset that is the correction value of the first motion vector. Here, the processor may correct the first motion vector by adding the first offset, may obtain a second offset that is the correction value of the second motion vector on the basis of the specific offset, and may correct the second motion vector by adding the second offset.

The processor may generate a first corrected motion vector by adding the first offset to the first motion vector and generate a second corrected motion vector by adding the second offset to the second motion vector, and may reconstruct the current block on the basis of the first corrected motion vector and the second corrected motion vector.

The processor may obtain the specific offset that is the correction value for one of the first motion vector and the second motion vector on the basis of values indicating the reference picture lists respectively corresponding to the first motion vector and the second motion vector when the first POC difference and the second POC difference are equal.

The processor may obtain the specific offset that is the correction value of the first motion vector when the value indicating a first reference picture list corresponding to the first motion vector is 0, and the value indicating a second reference picture list of the second motion vector is 1.

The first reference picture list may be used in a first higher level region in which up to one motion vector is used for a specific sample and a second higher level region in which up to two motion vectors are used for the specific sample, and the second reference picture list may not be used in the first higher level region.

Advantageous Effects

According to an embodiment of the present invention, the coding efficiency of a video signal may be increased. Furthermore, according to an embodiment of the present invention, the prediction performance of inter-prediction of a current block may be improved.

BRIEF DESCRIPTION OF THE DRAWINGS

FIG. 13 is a diagram illustrating a method of correcting a motion vector according to an embodiment of the present invention.

FIG. 14 is a diagram illustrating a search location for correcting a motion vector on the basis of an initial motion vector according to an embodiment of the present invention.

FIG. 21 is a diagram illustrating a method of updating a weight parameter set to be applied to a reference block when a current block is uni-predicted according to an embodiment of the present invention.

FIG. 22 is a diagram illustrating a method of predicting a current block on the basis of an additionally searched-for reference block according to an embodiment of the present invention.

FIG. 27 is a diagram illustrating whether signs match and sign determination according to an embodiment of the present invention.

FIG. 28 and FIG. 29 are diagrams illustrating a method of encoding sign information in consideration of context according to an embodiment of the present invention.

MODE FOR CARRYING OUT THE INVENTION

Terms used in this specification may be currently widely used general terms in consideration of functions in the present invention but may vary according to the intents of those skilled in the art, customs, or the advent of new technology. Additionally, in certain cases, there may be terms the applicant selects arbitrarily and, in this case, their meanings are described in a corresponding description part of the present invention. Accordingly, terms used in this specification should be interpreted based on the substantial meanings of the terms and contents over the whole specification.

In this specification, some terms may be interpreted as follows. Coding may be interpreted as encoding or decoding in some cases. In the present specification, an apparatus for generating a video signal bitstream by performing encoding (coding) of a video signal is referred to as an encoding apparatus or an encoder, and an apparatus that performs decoding (decoding) of a video signal bitstream to reconstruct a video signal is referred to as a decoding apparatus or decoder. In addition, in this specification, the video signal processing apparatus is used as a term of a concept including both an encoder and a decoder. Information is a term including all values, parameters, coefficients, elements, etc. In some cases, the meaning is interpreted differently, so the present invention is not limited thereto. 'Unit' is used as a meaning to refer to a basic unit of image processing or a specific position of a picture, and refers to an image region including both a luma component and a chroma component. In addition, 'block' refers to an image region including a specific component among luma components and chroma components (i.e., Cb and Cr). However, depending on the embodiment, terms such as 'unit', 'block', 'partition' and 'region' may be used interchangeably. In addition, in this specification, a unit may be used as a concept including all of a coding unit, a prediction unit, and a transform unit. The picture indicates a field or frame, and according to an embodiment, the terms may be used interchangeably.

Figure 1:
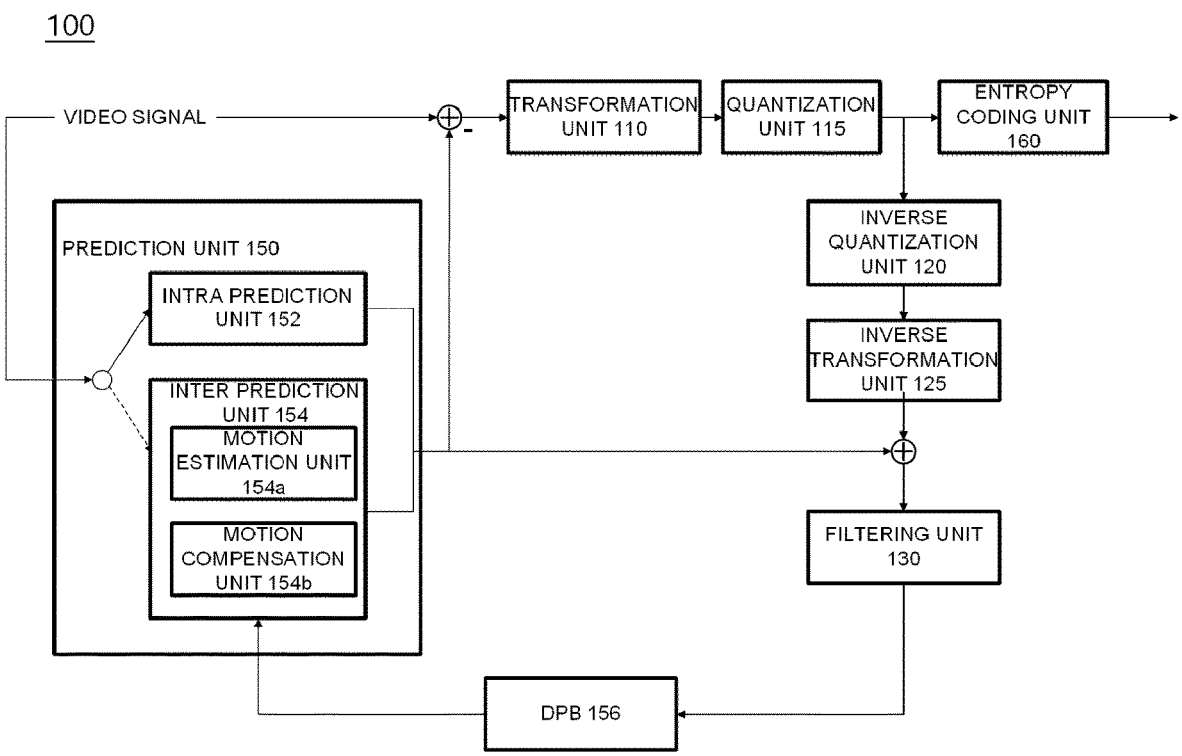
FIG. 1 is a schematic block diagram of a video signal encoding apparatus according to an embodiment of the present invention.

FIG. 1 is a schematic block diagram of a video signal encoding apparatus according to an embodiment of the present invention. Referring to FIG. 1, the encoding apparatus 100 of the present invention includes a transformation unit 110, a quantization unit 115, an inverse quantization unit 120, an inverse transformation unit 125, a filtering unit 130, a prediction unit 150, and an entropy coding unit 160.

The transformation unit 110 obtains a value of a transform coefficient by transforming a residual signal, which is a difference between the inputted video signal and the predicted signal generated by the prediction unit 150. For example, a Discrete Cosine Transform (DCT), a Discrete Sine Transform (DST), or a Wavelet Transform can be used. The DCT and DST perform transformation by splitting the input picture signal into blocks. In the transformation, coding efficiency may vary according to the distribution and characteristics of values in the transformation region. The quantization unit 115 quantizes the value of the transform coefficient value outputted from the transformation unit 110.

In order to improve coding efficiency, instead of coding the picture signal as it is, a method of predicting a picture using a region already coded through the prediction unit 150 and obtaining a reconstructed picture by adding a residual value between the original picture and the predicted picture to the predicted picture is used. In order to prevent mismatches in the encoder and decoder, information that can be used in the decoder should be used when performing prediction in the encoder. For this, the encoder performs a process of reconstructing the encoded current block again. The inverse quantization unit 120 inverse-quantizes the value of the transform coefficient, and the inverse transformation unit 125 reconstructs the residual value using the inverse quantized transform coefficient value. Meanwhile, the filtering unit 130 performs filtering operations to improve the quality of the reconstructed picture and to improve the coding efficiency. For example, a deblocking filter, a sample adaptive offset (SAO), and an adaptive loop filter may be included. The filtered picture is outputted or stored in a decoded picture buffer (DPB) 156 for use as a reference picture.

The prediction unit 150 includes an intra prediction unit 152 and an inter prediction unit 154. The intra prediction unit 152 performs intra prediction in the current picture, and the inter prediction unit 154 performs inter prediction to predict the current picture by using the reference picture stored in the DPB 156. The intra prediction unit 152 performs intra prediction from reconstructed samples in the current picture, and transmits intra coding information to the entropy coding unit 160. The intra encoding information may include at least one of an intra prediction mode, a Most Probable Mode (MPM) flag, and an MPM index. The inter prediction unit 154 may include a motion estimation unit 154a and a motion compensation unit 154b. The motion estimation unit 154a refers to a specific region of the reconstructed reference picture to obtain a motion vector value of the current region. The motion estimation unit 154a transmits motion information set (reference picture index, motion vector information, etc.) on the reference region to the entropy coding unit 160. The motion compensation unit 154b performs motion compensation using the motion vector value transmitted from the motion estimation unit 154a. The inter prediction unit 154 transmits inter encoding information including motion information set on a reference region to the entropy coding unit 160.

When the picture prediction described above is performed, the transformation unit 110 transforms a residual value between the original picture and the predicted picture to obtain a transform coefficient value. In this case, the transformation may be performed in a specific block unit within a picture, and the size of a specific block may be varied within a preset range. The quantization unit 115 quantizes the transform coefficient value generated in the transformation unit 110 and transmits it to the entropy coding unit 160.

The entropy coding unit 160 entropy-codes quantized transform coefficients, intra coding information, and inter coding information to generate a video signal bitstream. In the entropy coding unit 160, a variable length coding (VLC) method, an arithmetic coding method, or the like can be used. The VLC method transforms inputted symbols into successive codewords, and the length of the codewords may be variable. For example, frequently occurring symbols are expressed as short codewords, and less frequently occurring symbols are expressed as long codewords. As the VLC method, a context-based adaptive variable length coding (CAVLC) method may be used. Arithmetic coding transforms successive data symbols into a single decimal point, and arithmetic coding can obtain the optimal number of decimal bits needed to represent each symbol. As arithmetic coding, context-based adaptive arithmetic coding (CABAC) may be used.

The generated bitstream is encapsulated using a network abstraction layer (NAL) unit as a basic unit. The NAL unit includes an integer number of coded coding tree units. In order to decode a bitstream in a video decoder, first, the bitstream must be separated in NAL units, and then each separated NAL unit must be decoded. Meanwhile, information necessary for decoding a video signal bitstream may be transmitted through an upper level set of Raw Byte Sequence Payload (RBSP) such as Picture Parameter Set (PPS), Sequence Parameter Set (SPS), Video Parameter Set (VPS), and the like.

Meanwhile, the block diagram of FIG. 1 shows an encoding apparatus 100 according to an embodiment of the present invention, and separately displayed blocks logically distinguish and show the elements of the encoding apparatus 100. Accordingly, the elements of the above-described encoding apparatus 100 may be mounted as one chip or as a plurality of chips depending on the design of the device. According to an embodiment, the operation of each element of the above-described encoding apparatus 100 may be performed by a processor (not shown).

Figure 2:
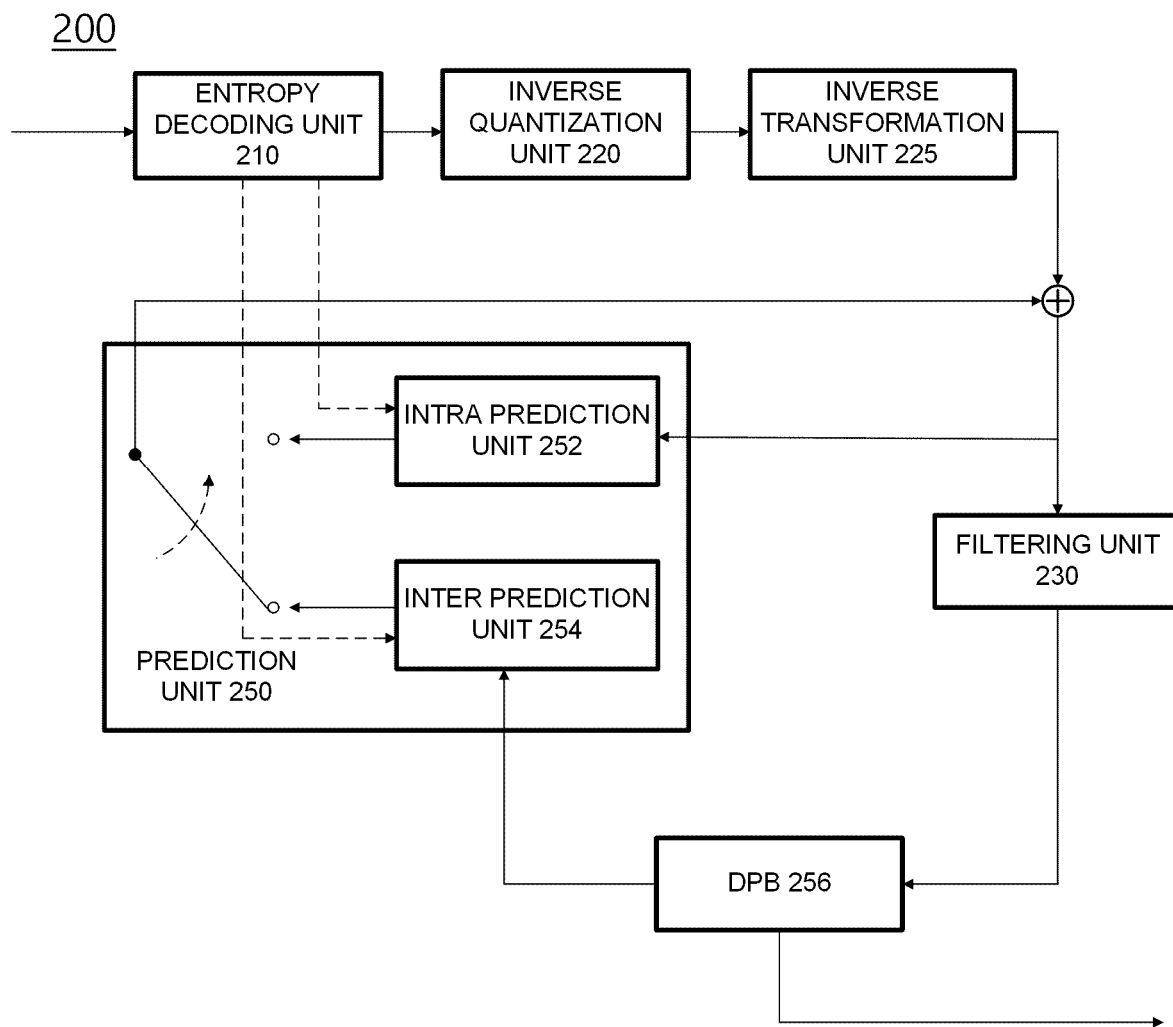
FIG. 2 is a schematic block diagram of a video signal decoding apparatus according to an embodiment of the present invention.

FIG. 2 is a schematic block diagram of a video signal decoding apparatus 200 according to an embodiment of the present invention. Referring to FIG. 2, the decoding apparatus 200 of the present invention includes an entropy decoding unit 210, an inverse quantization unit 220, an inverse transformation unit 225, a filtering unit 230, and a prediction unit 250.

The entropy decoding unit 210 entropy-decodes a video signal bitstream, and extracts transform coefficients, intra encoding information, and inter encoding information for each region. The inverse quantization unit 220 inverse-quantizes the entropy decoded transform coefficient, and the inverse transformation unit 225 reconstructs the residual value using the inverse quantized transform coefficient. The video signal processing apparatus 200 reconstructs the original pixel value by adding the residual value obtained in the inverse transformation unit 225 and the predictor obtained in the prediction unit 250.

Meanwhile, the filtering unit 230 performs filtering on a picture to improve image quality. This may include a deblocking filter for reducing block distortion and/or an adaptive loop filter for removing distortion of the entire picture. The filtered picture is outputted or stored in the DPB 256 for use as a reference picture for the next picture.

The prediction unit 250 includes an intra prediction unit 252 and an inter prediction unit 254. The prediction unit 250 generates a prediction picture by using the encoding type decoded through the entropy decoding unit 210 described above, transform coefficients for each region, and intra/inter encoding information. In order to reconstruct a current block in which decoding is performed, a decoded region of the current picture or other pictures including the current block may be used. In a reconstruction, only a current picture, that is, a picture (or, tile/slice) that performs only intra prediction, is called an intra picture or an I picture (or, tile/slice), and a picture (or, tile/slice) that can perform both intra prediction and inter prediction is called an inter picture (or, tile/slice). In order to predict sample values of each block among inter pictures (or, tiles/slices), a picture (or, tile/slice) using up to one motion vector and a reference picture index is called a predictive picture or P picture (or, tile/slice), and a picture (or tile/slice) using up to two motion vectors and a reference picture index is called a bi-predictive picture or a B picture (or tile/slice). In other words, the P picture (or, tile/slice) uses up to one motion information set to predict each block, and the B picture (or, tile/slice) uses up to two motion information sets to predict each block. Here, the motion information set includes one or more motion vectors and one reference picture index.

The intra prediction unit 252 generates a prediction block using the intra encoding information and restored samples in the current picture. As described above, the intra encoding information may include at least one of an intra prediction mode, a Most Probable Mode (MPM) flag, and an MPM index. The intra prediction unit 252 predicts the sample values of the current block by using the restored samples located on the left and/or upper side of the current block as reference samples. In this disclosure, restored samples, reference samples, and samples of the current block may represent pixels. Also, sample values may represent pixel values.

According to an embodiment, the reference samples may be samples included in a neighboring block of the current block. For example, the reference samples may be samples adjacent to the left boundary of the current block and/or samples adjacent to the upper boundary. Also, the reference samples may be samples located on a line within a predetermined distance from the left boundary of the current block and/or samples located on a line within a predetermined distance from the upper boundary of the current block among the samples of neighboring blocks of the current block. In this case, the neighboring block of the current block may include the left (L) block, the upper (A) block, the below left (BL) block, the above right (AR) block, or the above left (AL) block.

The inter prediction unit 254 generates a prediction block using reference pictures and inter encoding information stored in the DPB 256. The inter coding information may include motion information set (reference picture index, motion vector information, etc.) of the current block for the reference block. Inter prediction may include L0 prediction, L1 prediction, and bi-prediction. L0 prediction means prediction using one reference picture included in the L0 picture list, and L1 prediction means prediction using one reference picture included in the L1 picture list. For this, one set of motion information (e.g., motion vector and reference picture index) may be required. In the bi-prediction method, up to two reference regions may be used, and the two reference regions may exist in the same reference picture or may exist in different pictures. That is, in the bi-prediction method, up to two sets of motion information (e.g., a motion vector and a reference picture index) may be used and two motion vectors may correspond to the same reference picture index or different reference picture indexes. In this case, the reference pictures may be displayed (or outputted) both before and after the current picture in time aspect.

The inter prediction unit 254 may obtain a reference block of the current block using a motion vector and a reference picture index. The reference block is in a reference picture corresponding to a reference picture index. Also, a sample value of a block specified by a motion vector or an interpolated value thereof can be used as a predictor of the current block. For motion prediction with sub-pel unit pixel accuracy, for example, an 8-tap interpolation filter for a luma signal and a 4-tap interpolation filter for a chroma signal can be used. However, the interpolation filter for motion prediction in sub-pel units is not limited thereto. In this way, the inter prediction unit 254 performs motion compensation to predict the texture of the current unit from motion pictures reconstructed previously. Here, the inter-prediction unit may use a motion information set.

The reconstructed video picture is generated by adding the predictor outputted from the intra prediction unit 252 or the inter prediction unit 254 and the residual value outputted from the inverse transformation unit 225. That is, the video signal decoding apparatus 200 reconstructs the current block using the prediction block generated by the prediction unit 250 and the residual obtained from the inverse transformation unit 225.

Meanwhile, the block diagram of FIG. 2 shows a decoding apparatus 200 according to an embodiment of the present invention, and separately displayed blocks logically distinguish and show the elements of the decoding apparatus 200. Accordingly, the elements of the above-described decoding apparatus 200 may be mounted as one chip or as a plurality of chips depending on the design of the device. According to an embodiment, the operation of each element of the above-described decoding apparatus 200 may be performed by a processor (not shown).

Figure 3:
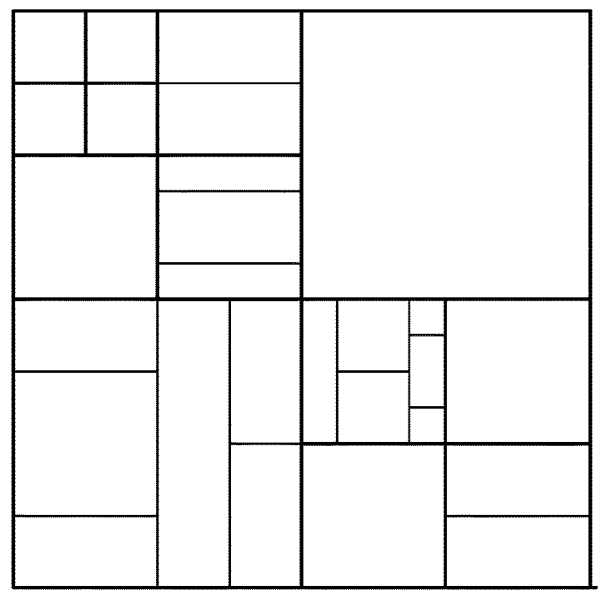
FIG. 3 shows an embodiment in which a coding tree unit is divided into coding units in a picture.

FIG. 3 illustrates an embodiment in which a coding tree unit (CTU) is split into coding units (CUs) in a picture. In the coding process of a video signal, a picture may be split into a sequence of coding tree units (CTUs). The coding tree unit is composed of an N×N block of luma samples and two blocks of chroma samples corresponding thereto. The coding tree unit can be split into a plurality of coding units. The coding tree unit is not split and may be a leaf node. In this case, the coding tree unit itself may be a coding unit. The coding unit refers to a basic unit for processing a picture in the process of processing the video signal described above, that is, intra/inter prediction, transformation, quantization, and/or entropy coding. The size and shape of the coding unit in one picture may not be constant. The coding unit may have a square or rectangular shape. The rectangular coding unit (or rectangular block) includes a vertical coding unit (or vertical block) and a horizontal coding unit (or horizontal block). In the present specification, the vertical block is a block whose height is greater than the width, and the horizontal block is a block whose width is greater than the height. Further, in this specification, a non-square block may refer to a rectangular block, but the present invention is not limited thereto.

Referring to FIG. 3, the coding tree unit is first split into a quad tree (QT) structure. That is, one node having a 2N×2N size in a quad tree structure may be split into four nodes having an N×N size. In the present specification, the quad tree may also be referred to as a quaternary tree. Quad tree split can be performed recursively, and not all nodes need to be split with the same depth.

Meanwhile, the leaf node of the above-described quad tree may be further split into a multi-type tree (MTT) structure. According to an embodiment of the present invention, in a multi-type tree structure, one node may be split into a binary or ternary tree structure of horizontal or vertical division. That is, in the multi-type tree structure, there are four split structures such as vertical binary split, horizontal binary split, vertical ternary split, and horizontal ternary split. According to an embodiment of the present invention, in each of the tree structures, the width and height of the nodes may all have powers of 2. For example, in a binary tree (BT) structure, a node of a 2N×2N size may be split into two N×2N nodes by vertical binary split, and split into two 2N×N nodes by horizontal binary split. In addition, in a ternary tree (TT) structure, a node of a 2N×2N size is split into (N/2)×2N, N×2N, and (N/2)×2N nodes by vertical ternary split, and split into 2N×(N/2), 2N×N, and 2N×(N/2) nodes by horizontal ternary split. This multi-type tree split can be performed recursively.

The leaf node of the multi-type tree can be a coding unit. When division of a coding unit is not indicated or the coding unit is not larger compared to a maximum conversion length, the coding unit is used as a unit of prediction and conversion without being divided further. On the other hand, at least one of the following parameters in the above-described quad tree and multi-type tree may be predefined or transmitted through a higher level set of RBSPs such as PPS, SPS, VPS, and the like. 1) CTU size: root node size of quad tree, 2) minimum QT size MinQtSize: minimum allowed QT leaf node size, 3) maximum BT size MaxBtSize: maximum allowed BT root node size, 4) Maximum TT size MaxTtSize: maximum allowed TT root node size, 5) Maximum MTT depth MaxMttDepth: maximum allowed depth of MTT split from QT's leaf node, 6) Minimum BT size MinBtSize: minimum allowed BT leaf node size, 7) Minimum TT size MinTtSize: minimum allowed TT leaf node size.

Figure 4:
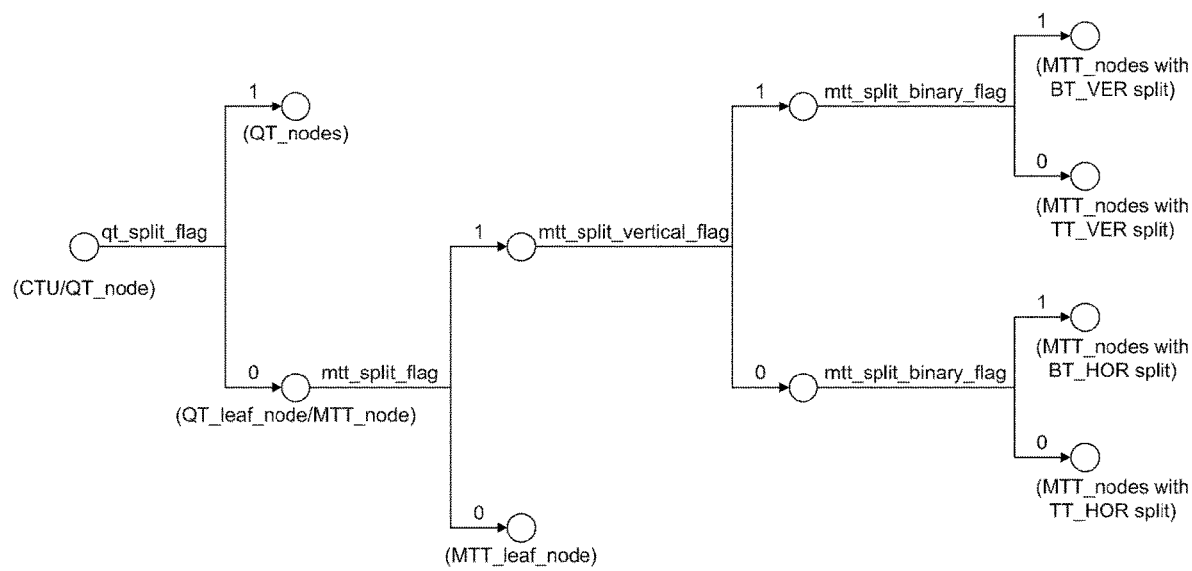
FIG. 4 shows an embodiment of a method for signaling a division of a quad tree and a multi-type tree.

FIG. 4 shows an embodiment of a method for signaling the split of a quad tree and a multi-type tree. Preset flags may be used to signal the split of the above-described quad tree and multi-type tree. Referring to FIG. 4, at least one of a flag 'qt_split_flag' indicating whether to split the quad tree node, a flag 'mtt_split_flag' indicating whether to split the multi-type tree node, a flag 'mtt_split_vertical_flag' indicating a split direction of a multi-type tree node, or a flag 'mtt_split_binary_flag' indicating a split shape of a multi-type tree node may be used.

According to an embodiment of the present invention, the coding tree unit is a root node of a quad tree, and can be first split into a quad tree structure. In the quad tree structure, 'qt_split_flag' is signaled for each node 'QT_node'. If the value of 'qt_split_flag' is 1, the node is split into 4 square nodes, and if the value of 'qt_split_flag' is 0, the corresponding node becomes the leaf node 'QT leaf node' of the quad tree.

Each quad tree leaf node 'QT leaf node' may be further split into a multi-type tree structure. In the multi-type tree structure, 'mtt_split_flag' is signaled for each node 'MTT_node'. When the value of 'mtt_split_flag' is 1, the corresponding node is split into a plurality of rectangular nodes, and when the value of 'mtt_split_flag' is 0, the corresponding node is a leaf node 'MTT leaf node' of the multi-type tree. When the multi-type tree node 'MTT_node' is split into a plurality of rectangular nodes (i.e., when the value of 'mtt_split_flag' is 1), 'mtt_split_vertical_flag' and 'mtt_split_binary_flag' for the node 'MTT_node' may be additionally signaled. When the value of 'mtt_split_vertical_flag' is 1, vertical split of node 'MTT_node' is indicated, and when the value of 'mtt_split_vertical_flag' is 0, horizontal split of node 'MTT_node' is indicated. In addition, when the value of 'mtt_split_binary_flag' is 1, the node 'MTT_node' is split into 2 rectangular nodes, and when the value of 'mtt_split_binary_flag' is 0, the node 'MTT_node' is split into 3 rectangular nodes.

Figure 5:
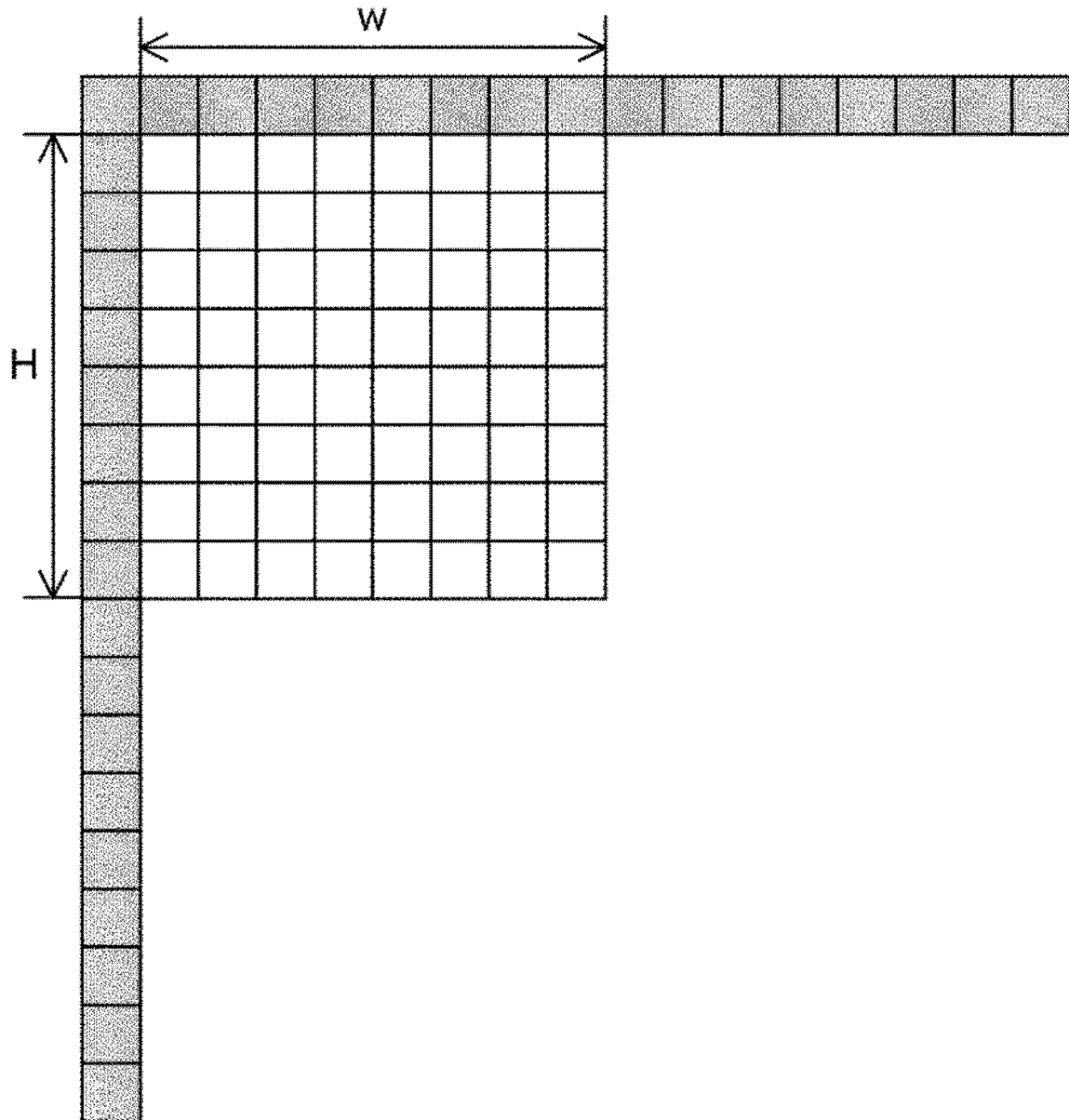
FIGS. 5 and 6 illustrate an intra-prediction method according to an embodiment of the present invention.
Figure 6:
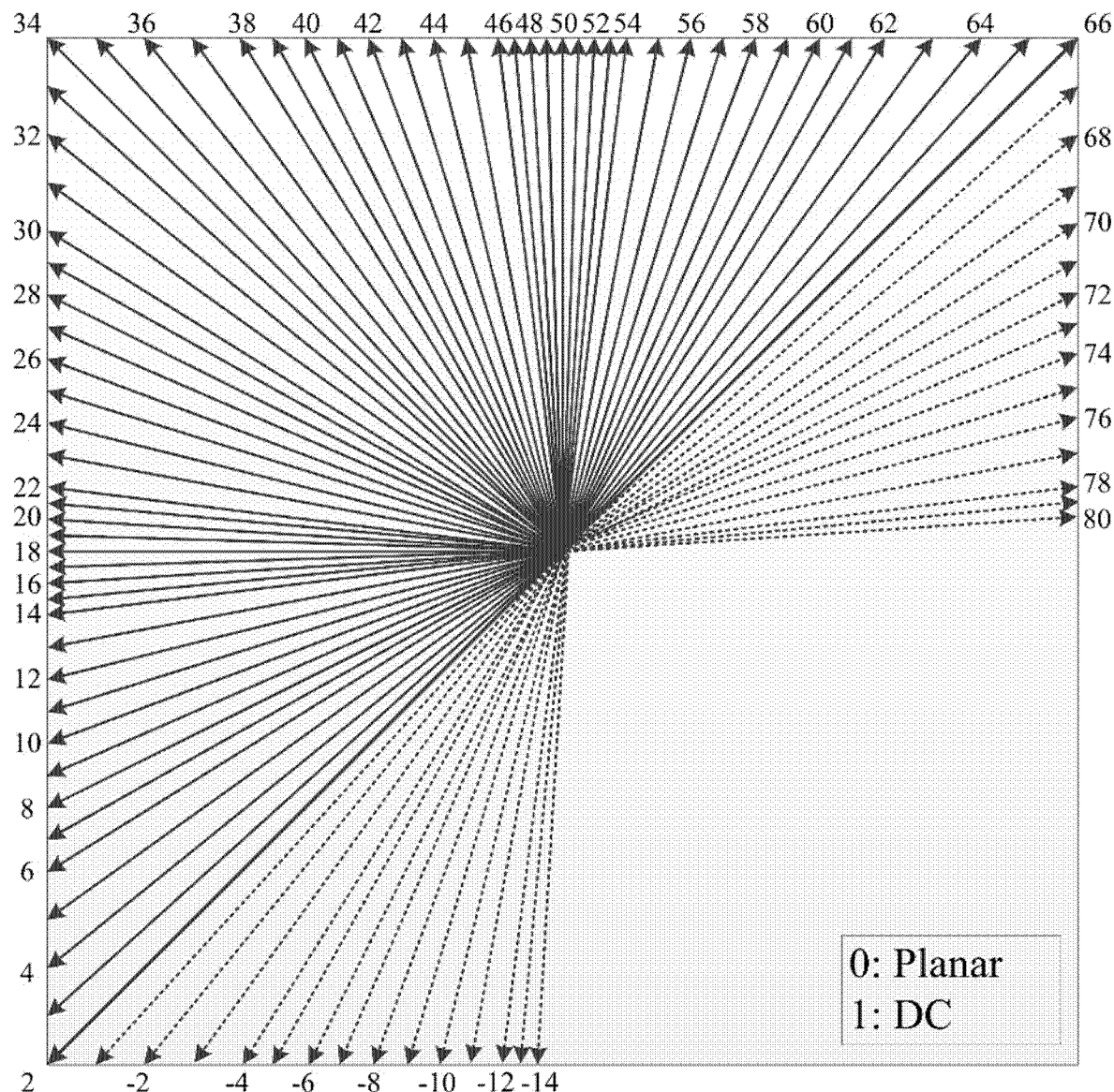

FIGS. 5 and 6 illustrate an intra prediction method according to an embodiment of the present invention. As described above, the intra prediction unit predicts the sample values of the current block by using the restored samples located on the left and/or upper side of the current block as reference samples.

First, FIG. 5 shows an embodiment of reference samples used for prediction of a current block in an intra prediction mode. According to an embodiment, the reference samples may be samples adjacent to the left boundary of the current block and/or samples adjacent to the upper boundary. As shown in FIG. 5, when the size of the current block is W×H and samples of a single reference line adjacent to the current block are used for intra prediction, reference samples may be configured using a maximum of 2 W+2H+1 neighboring samples located on the left and/or upper side of the current block.

According to a further embodiment of the present invention, samples on a plurality of reference lines may be used for intra prediction of the current block. The plurality of reference lines may consist of n lines located within a predetermined distance from the boundary of the current block. In this case, separate reference line information indicating at least one reference line used for intra prediction of the current block may be signaled. Specifically, the reference line information may include an index indicating any one of a plurality of reference lines. In addition, if at least some of the samples to be used as reference samples have not been restored, the intra prediction unit may obtain a reference sample by performing a reference sample padding process. In addition, the intra prediction unit may perform a reference sample filtering process to reduce errors in intra prediction. That is, filtered reference samples may be obtained by filtering reference samples obtained through neighboring samples and/or reference sample padding process. The intra-prediction unit predicts samples of a current block using unfiltered reference samples or filtered reference samples. In the present disclosure, neighboring samples may include samples on at least one reference line. For example, neighboring samples may include adjacent samples on a line adjacent to the boundary of the current block.

Next, FIG. 6 shows an embodiment of prediction modes used for intra prediction. For intra prediction, intra prediction mode information indicating an intra prediction direction may be signaled. The intra prediction mode information indicates one of a plurality of intra prediction modes included in the intra prediction mode set. When the current block is an intra prediction block, the decoder receives intra prediction mode information of the current block from the bitstream. The intra prediction unit of the decoder performs intra prediction on the current block based on the extracted intra prediction mode information.

According to an embodiment of the present invention, the intra prediction mode set may include all intra prediction modes used in intra prediction (e.g., a total of 67 intra prediction modes). More specifically, the intra prediction mode set may include a planar mode, a DC mode, and a plurality (e.g., 65) of angle modes (i.e., directional modes). In some embodiments, the intra prediction mode set may consist of some of all intra prediction modes. Each intra prediction mode may be indicated through a preset index (i.e., intra prediction mode index). For example, as shown in FIG. 6, the intra prediction mode index 0 indicates a planar mode, and the intra prediction mode index 1 indicates a DC mode. Also, the intra prediction mode indexes 2 to 66 may indicate different angle modes, respectively. In this case, the intra prediction mode index 2 indicates a horizontal diagonal (HDIA) mode, the intra prediction mode index 18 indicates a horizontal (Horizontal, HOR) mode, the intra prediction mode index 34 indicates a diagonal (DIA) mode, the intra prediction mode index 50 indicates a vertical (VER) mode, and the intra prediction mode index 66 indicates a vertical diagonal (VDIA) mode.

Figure 7:
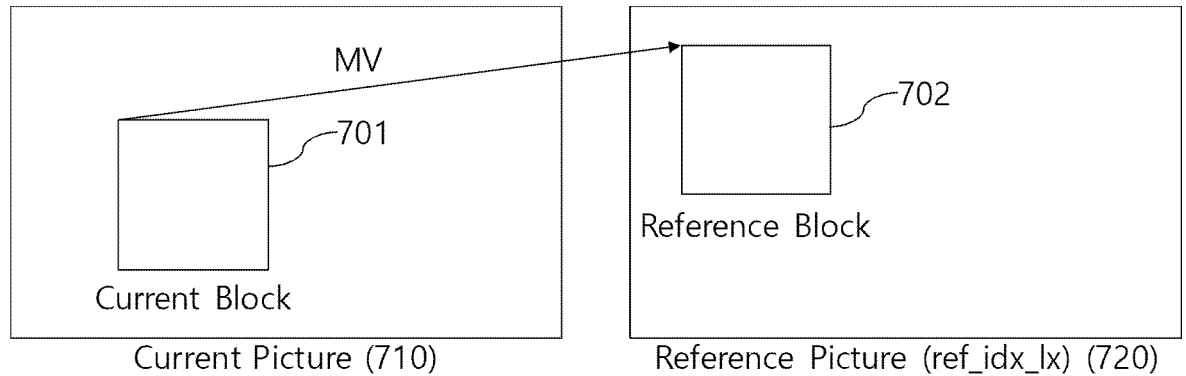
FIG. 7 illustrates an inter-prediction method according to an embodiment of the present invention.

FIG. 7 illustrates an inter-prediction method according to an embodiment of the present invention. As described above, the decoder may predict a current block by referencing reconstructed samples of another picture decoded. Referring to FIG. 7, the decoder obtains a reference block 702 in a reference picture 720 on the basis of a motion information set of a current block 701. Here, the motion information set may include a reference picture index ref_idx_lx and a motion vector MV. The reference picture index ref_idx_lx indicates the reference picture 720 including a reference block for inter-prediction of a current block in a reference picture list lx. The motion vector MV indicates an offset between a coordinate value of the current block 701 in a current picture 710 and a coordinate value of the reference block 702 in the reference picture 720. The decoder obtains a predictor of the current block 701 on the basis of sample values of the reference block 702, and reconstructs the current block 701 using the predictor.

In detail, the encoder may obtain the above-described reference block by searching for a block similar to the current block from pictures which precede in terms of reconstruction order. For example, the encoder may search for a reference block having a minimum sum of sample value differences with the current block within a preset search region. Here, in order to measure similarity between samples of the current block and the reference block, at least one of sum of absolute difference (SAD) or sum of Hadamard transformed difference (SATD) may be used. Here, the SAD may be a value obtained by adding up all of the absolute values of the differences between values of the samples included in the two blocks. Furthermore, the SATD may be a value obtained by adding up all of the absolute values of Hadamard transform coefficients obtained by Hadamard-transforming the differences between values of the samples included in the two blocks.

Figure 8:
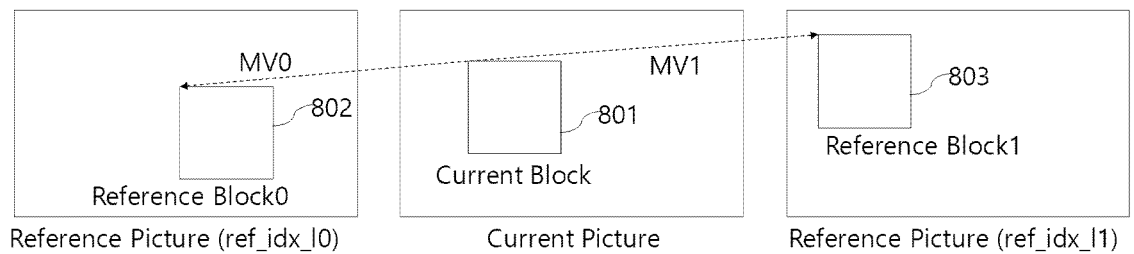
FIG. 8 illustrates a bi-prediction method according to an embodiment of the present invention.

Meanwhile, the current block may also be predicted using at least one reference region. As described above, the current block may be inter-predicted using a bi-prediction scheme in which up to two reference regions are used. FIG. 8 illustrates a bi-prediction method according to an embodiment of the present invention. Referring to FIG. 8, the decoder may obtain two reference blocks 802 and 803 on the basis of two motion information sets of a current block 801. Furthermore, the decoder may obtain a first predictor and a second predictor of the current block on the basis of each of sample values of the two obtained reference blocks. Furthermore, the decoder may reconstruct the current block 801 using the first predictor and the second predictor.

According to an embodiment, the decoder may reconstruct the current block 801 on the basis of an average for each sample of the first predictor and the second predictor. According to another embodiment, the decoder may reconstruct the current block 801 by applying different weight values to the first predictor and the second predictor. In this case, information indicating usage or non-usage of the weight values may be signaled through PPS or SPS. The weight value and offset value used for predicting the current block 801 may be transmitted in units of slice/tile through a slice/tile header. Furthermore, the weight value and offset value used for predicting the current block 801 may be transmitted for each coding unit. A method of predicting a current block using a weight value will be described later with reference to FIGS. 18 to 25.

As described above, one or more motion information sets may be signaled for motion compensation of a current block. In a method of signaling a motion information set of a current block, redundancy between motion information sets used for motion compensation of each of a plurality of blocks may be used. This is because the motion information set used for predicting a current block may be induced from the motion information set used for predicting any one of pre-reconstructed other samples.

For example, there may be a plurality of candidate blocks that are likely to have been predicted on the basis of a motion information set which is the same as or similar to the motion information set of the current block. The decoder may generate a merge candidate list on the basis of the plurality of candidate blocks. Here, the merge candidate list may include candidates corresponding to samples that are likely to have been predicted on the basis of a motion information set related to the motion information set of the current block, among samples reconstructed earlier than the current block. The encoder and the decoder may configure the merge candidate list of the current block according to a predefined rule. Here, the merge candidate lists respectively configured by the encoder and the decoder may be the same. For example, the encoder and the decoder may configure the merge candidate list of the current block on the basis of a location of the current block in a current picture. A method for the encoder and the decoder to configure the merge candidate list of the current block will be described later with reference to FIG. 9. In the present disclosure, the location of a specific block indicates a relative location of a top-left sample of the specific block in a picture including the specific block.

According to an embodiment, when the current block is predicted using the merge candidate list, the current block may be reconstructed on the basis of the motion information set corresponding to any one of candidates included in the merge candidate list. For example, the motion vector of the current block may be obtained on the basis of the motion vector of any one of the candidates included in the merge candidate list. Furthermore, a reference picture to be referenced for predicting the current block may be obtained on the basis of a reference picture list and a reference picture index corresponding to any one of the candidates.

In detail, a merge index indicating any one of a plurality of candidates included in the merge candidate list may be signaled. The decoder may receive the merge index signaled from the encoder. The decoder may perform motion compensation of the current block on the basis of the motion information set corresponding to a candidate indicated by the merge index. The candidate indicated by the merge index may be referred to as a merge target. The decoder may obtain the motion information set of the current block on the basis of the motion information set corresponding to the merge target. That is, the motion compensation of the current block may be performed on the basis of the reference picture index of the merge target and the motion vector of the merge target. In this manner, the encoder and the decoder may reduce a motion information signaling overhead.

According to an embodiment, a prediction method using the merge candidate list may be divided into a skip mode and a merge mode. For example, when the prediction method of the current block is the skip mode, a residual signal of the current block may not be signaled. In this case, the decoder may reconstruct the current block on the basis of a predictor of the current block generated on the basis of the merge index. When the prediction method of the current block is the merge mode, the merge index and the residual signal may be signaled from the encoder. In this case, the decoder may reconstruct the current block on the basis of the merge index and the residual signal of the current block. The decoder may generate the predictor of the current block on the basis of the motion information set of the merge target indicated by the merge index of the current block. Next, the decoder may reconstruct the current block on the basis of the generated predictor of the current block and the received residual signal.

Figure 9:
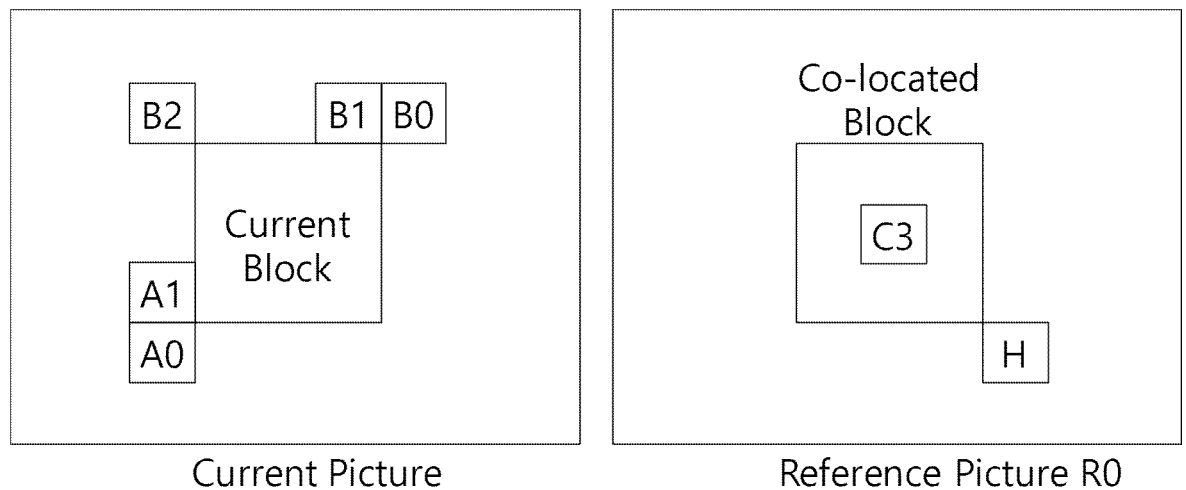
FIG. 9 is a diagram illustrating a method of configuring a merge candidate list according to an embodiment of the present invention.

Hereinafter, a method of configuring a merge candidate list according to an embodiment of the present invention will be described in detail with reference to FIG. 9. FIG. 9 is a diagram illustrating a method of configuring a merge candidate list according to an embodiment of the present invention. According to an embodiment, the merge candidate list may include at least one of a spatial candidate or a temporal candidate. Here, the spatial candidate may represent a candidate configured on the basis of neighboring blocks of the current block. This is because the motion information set for the current block may be the same as or similar to the motion information set used for predicting any one of the neighboring blocks of the current block. In the present disclosure, the spatial candidate or the temporal candidate may be referred to as a block corresponding to each of the candidates.

Referring to FIG. 9, the spatial candidate of the merge candidate list may be configured on the basis of available neighboring blocks A0, A1, B0, B1, and B2 corresponding to preset locations among neighboring blocks adjacent to the current block. In detail, the spatial candidate of the merge candidate list may include at least one of a bottom-left block A0, a left block A1, a top-right block B0, a top block B1, or a top-left block B2. Here, the decoder may sequentially search for A1, B1, B0, A0, and B2 to configure up to four spatial candidates. Furthermore, when a specific block among the neighboring block has been intra-predicted, a specific block is not present, or a prediction mode of a specific block is not available, the corresponding block may be configured to be unavailable.

For example, when A1 is not available, the decoder may not include A1 in the merge candidate list. Next, the decoder may determine whether B1 is available. Here, when B1 is available, the decoder may configure the merge candidate list including B1. The decoder may search for the remaining neighboring blocks B0, A0, and B2 so that the merge candidate list includes up to four spatial candidates. Furthermore, the motion information set of a specific neighboring block may be searched for earlier than the specific neighboring block, and may be the same as the motion information set of another neighboring block included in the merge candidate list. In this case, the decoder may not include the corresponding neighboring block in the merge candidate list.

As described above, the merge candidate list may include the temporal candidate. The temporal candidate may represent a candidate configured on the basis of a block corresponding to the location of the current block in another picture other than the current picture. This is because the motion information set for the current block may be the same as or similar to the motion information set used for predicting a block included in another picture. For example, the other picture other than the current picture may be a pre-configured reference picture R0. The pre-configured reference picture R0 may be signaled through a header of a higher level including the current block. Here, the higher level may represent a slice/tile, picture, or CTU or coding tree block (CTB) including the current block. In detail, the encoder may insert, into the header of the higher level, the reference picture index indicating the pre-configured reference picture R0 in a specific reference picture list.

Referring to FIG. 9, the temporal candidate may include either a co-located block C3 corresponding to the same location as the location of the current block in the current picture in the pre-configured reference picture R0 or a bottom-right block H of the co-located block C3. Here, the decoder may search for H preferentially over C3. For example, when H is not available, the decoder may not include H in the merge candidate list. Next, the decoder may determine whether C3 is available. Furthermore, when C3 is available, the decoder may configure the merge candidate list including C3. On the contrary, when H is available, the decoder may not perform an operation of determining whether C3 is available. That is, the merge candidate list may include up to one temporal candidate.

Furthermore, the decoder may scale the motion vector of the temporal candidate to use the scaled motion vector as the motion vector of the current block. The decoder may scale the motion vector of the temporal candidate according to a temporal distance between reference pictures. This is because a candidate block corresponding to the temporal candidate belongs to a picture that is different from that of the current block. In detail, the decoder may obtain a first value td by subtracting a picture order count (POC) of a picture referenced for predicting the temporal candidate from the POC of a picture including the temporal candidate. The decoder may obtain a second value tb by subtracting the POC of a reference picture to be referenced for predicting a current picture from the POC of the current picture. Furthermore, the decoder may scale the motion vector of the temporal candidate on the basis of the first value td and the second value tb. Here, the decoder may perform calculation using a fixed point method in which an offset value and a shift operation are used. In this manner, the decoder may not use a division operation.

According to an embodiment, when a sum of the number of spatial candidates and the number of temporal candidates is less than the maximum number of candidates that can be included in the merge candidate list, the decoder may include, in the merge candidate list, a candidate corresponding to an additional prediction method. The maximum number of merge candidates included in the merge candidate list may be signaled through the header of a higher level including the current block. According to an embodiment, an additional motion information list may be managed, which includes the motion information set used for a block reconstructed earlier than the current block. In detail, the motion information list may include motion information sets respectively used for a plurality of blocks reconstructed earlier than the current block in the current picture. In this case, the decoder may use at least some of the motion information sets included in the motion information list as candidates of the merge candidate list.

According to another embodiment, the decoder may select two candidates according to a preset order from among the candidates included in the merge candidate list. Furthermore, the decoder may generate an average motion vector on the basis of an average of motion vectors used for predicting each of the two selected candidates. The decoder may generate an average motion information set on the basis of the average motion vector. Furthermore, the decoder may use the generated average motion information set as a candidate of the merge candidate list.

According to another embodiment, the decoder may generate bi-prediction information by combining unidirectional prediction information. In detail, when a plurality of candidates have been predicted on the basis of the unidirectional prediction information, the decoder may combine the unidirectional prediction information about the candidates to generate the bi-prediction information for prediction. Furthermore, the decoder may add the generated bi-prediction information to the merge candidate list. Furthermore, the decoder may include a candidate corresponding to a zero motion vector in the merge candidate list.

As described above, the encoder and the decoder according to an embodiment may reduce the overhead related to motion information signaling by using the merge candidate list and the merge index. However, it may be difficult to accurately express a motion of the current block using the motion vectors of merge candidates included in the merge candidate list. According to an embodiment of the present invention, a motion vector corrected from the motion vector of a merge candidate indicated by the merge index may be used as the motion vector of the current block. In this manner, the encoder and the decoder may improve prediction performance of the prediction method using the merge candidate list. Hereinafter, a method of correcting the motion vector of the current block according to an embodiment of the present invention will be described in detail.

According to an embodiment of the present invention, the decoder may correct the motion vector of the current block. For example, when the current block is predicted using the merge candidate list, the decoder may correct the motion vector of the current block. Here, the motion vector of the current block may be a merge motion vector obtained from the motion vector of a merge target. In the present disclosure, the merge motion vector may represent the motion vector of the current block obtained from the motion information set corresponding to the merge target. The decoder may generate a corrected motion vector by correcting the merge motion vector. Furthermore, the decoder may predict the current block on the basis of the corrected motion vector.

According to an embodiment, the merge motion vector may be corrected on the basis of a motion vector offset. Here, the motion vector offset may indicate a difference between an ante-correction motion vector and a corrected motion vector. For example, the decoder may generate the corrected motion vector by adding the motion vector offset to the merge motion vector. Here, the motion vector offset may be signaled, or may be induced according to a preset rule.

According to an embodiment, information indicating the motion vector offset may be separately signaled. Here, the information indicating the motion vector offset may include at least one of an absolute value of the motion vector offset or a sign of the motion vector offset. The absolute value of the motion vector offset may indicate the distance between the ante-correction motion vector and the corrected motion vector. In detail, the absolute value of the motion vector offset may be obtained through a distance index. For example, the encoder may signal the distance index corresponding to a specific distance on the basis of a table predefined between the encoder and the decoder. Furthermore, the decoder may determine the absolute value of the motion vector offset on the basis of a received distance index and the table predefined between the encoder and the decoder.

Furthermore, the sign of the motion vector offset may be obtained through a sign index. The sign index may indicate a sign set including signs respectively corresponding to an x-axis component and a y-axis component of coordinates (x, y) indicating a motion vector. For example, a sign information table including a specific sign set mapped to a specific sign index may be managed. The sign information table may be the same between the encoder and the decoder.

Next, the decoder may reconstruct the current block on the basis of the corrected motion vector. The decoder may generate the predictor of the current block on the basis of the corrected motion vector. Furthermore, when the prediction mode of the current block is the above-described merge mode, the decoder may reconstruct the current block on the basis of the predictor of the current block and the residual signal of the current block. When the prediction mode of the current block is the above-described skip mode, the decoder may reconstruct the current block on the basis of the predictor of the current block without the residual signal.

Meanwhile, as described above, inter-prediction may be performed on the basis of a plurality of motion information sets. For example, the decoder may obtain the motion information set of the current block on the basis of the motion information set of a merge target block indicated by the merge index of the current block. Here, when the merge target has been predicted on the basis of a plurality of motion information sets, a plurality of motion information sets may also be used for predicting the current block. Hereinafter, a method of correcting a plurality of motion vectors of the current block will be described. In particular, although the present disclosure exemplarily describes the case in which the current block is predicted on the basis of two motion information sets obtained through the merge candidate list, the present disclosure is not limited thereto.

According to an embodiment of the present invention, when the merge target includes a plurality of motion information sets, a plurality of motion vector offsets respectively corresponding to a plurality of motion vectors may be required. In this case, the decoder may obtain, first of all, a specific motion vector offset which is one of the plurality of motion vector offsets, and may obtain other motion vector offsets on the basis of the specific motion vector offset. In this manner, the signaling overhead or complexity of the decoder related to acquisition of a motion vector offset may be reduced. Hereinafter, according to an embodiment of the present invention, a method of determining a motion vector for which a motion vector offset is obtained first among a plurality of motion vectors will be described with reference to FIG. 10.

Figure 10:
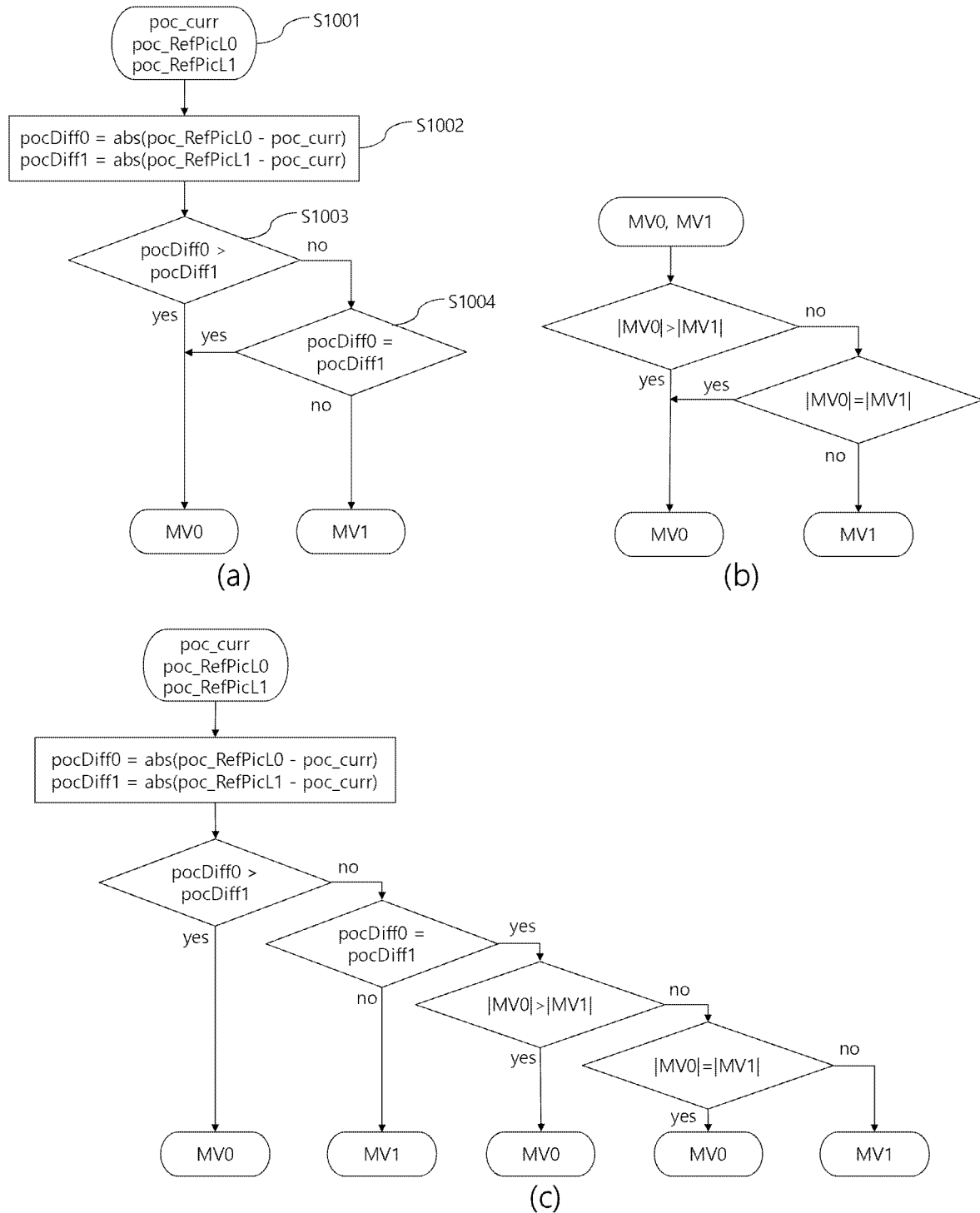
FIG. 10 is a diagram illustrating a method of correcting a motion vector according to an embodiment of the present invention.

FIG. 10 is a diagram illustrating a method of correcting a motion vector according to an embodiment of the present invention. According to an embodiment of the present invention, a plurality of merge motion vectors may be corrected on the basis of the POC of at least one reference picture of a merge target. The decoder may correct the plurality of merge motion vectors on the basis of POC differences between a current picture and each of reference pictures respectively corresponding to the plurality of merge motion vectors. For example, the decoder may compare the POC differences between the current picture and each of the reference pictures respectively corresponding to the plurality of merge motion vectors. Furthermore, the decoder may correct a plurality of motion vectors on the basis of a comparison result. The POC difference may represent an absolute value of a value obtained by subtracting the POC of the reference picture from the POC of the current picture or vice versa.

According to an embodiment, the plurality of motion vectors may include a first motion vector and a second motion vector. In this case, the decoder may obtain a first POC difference between the current picture and a first reference picture corresponding to the first motion vector. Furthermore, the decoder may obtain a second POC difference between the current picture and a second reference picture corresponding to the second motion vector. The decoder may compare the first POC difference and the second POC difference to obtain a specific motion vector offset which is a correction value of either the first motion vector or the second motion vector. The decoder may obtain the motion vector offset of one of the first motion vector and the second motion vector earlier than the motion vector offset of the other one.

For example, the motion vector offset of a motion vector corresponding to a reference picture having the larger POC difference among the first POC difference and the second POC difference may be obtained earlier than the motion vector offset of a motion vector corresponding to a reference picture having the smaller POC difference. This is because as the difference between the POC of a current picture and the POC of a reference picture including a reference block increases, a temporal distance between the reference block and the current block may increase and correlation therebetween may decrease. Therefore, a motion vector corresponding to a reference picture having a larger POC difference from the current picture may have a larger absolute value of the motion vector offset. The decoder may obtain a specific motion vector offset of a specific motion vector expected to have a relatively large absolute value of a motion vector offset earlier than another motion vector offset. In detail, only the specific motion vector offset may be signaled to the decoder, or may be preferentially determined by the decoder. A motion vector corresponding to a reference picture having a relatively small POC difference from a current picture may be corrected on the basis of a motion vector offset scaled from the specific motion vector offset.

For example, when the first POC difference is larger than or equal to the second POC difference, the specific motion vector offset may be a correction value for the first motion vector. On the contrary, when the first POC difference is less than the second POC difference, the specific motion vector offset may be a correction value for the second motion vector. Here, the first motion vector may be a motion vector corresponding to a reference picture list L0, and the second motion vector may be a motion vector corresponding to a reference picture list L1.

In the embodiment of FIG. 10, the motion information set of the current block may include a first motion information set including a first motion vector MV0 and a second motion information set including a second motion vector MV1. In addition, the first motion information set may include a first reference picture index, and the second motion information set may include a second reference picture index. According to an embodiment, the decoder may obtain the motion information set of the current block on the basis of the motion information set of the merge target. The decoder may obtain the motion vector of the current block by correcting MV0 and MV1.

Referring to FIG. 10(a), when the first POC difference between the current picture and the first reference picture corresponding to MV0 is larger than or equal to the second POC difference between the current picture and the second reference picture corresponding to MV1, the decoder may obtain a first motion vector offset which is applied to MV0 earlier than a second motion vector offset which is applied to MV1. Furthermore, the decoder may correct MV0 on the basis of the first motion vector offset. Next, the second motion vector offset may be obtained on the basis of the first motion vector offset. Furthermore, the decoder may correct MV1 on the basis of the second motion vector offset.

On the contrary, when the first POC difference is less than the second POC difference, the decoder may obtain the second motion vector offset preferentially over the first motion vector offset. Furthermore, the decoder may correct MV1 on the basis of the second motion vector offset. Next, the first motion vector offset may be obtained on the basis of the second motion vector offset. Furthermore, the decoder may correct MV0 on the basis of the first motion vector offset.

In detail, in step S1001, the decoder may obtain a POC poc_curr of the current block, a POC poc_RefPic0 of the first reference picture, and a POC poc_RefPic1 of the second reference picture. Here, the first reference picture and the second reference picture may respectively correspond to the reference picture lists L0 and L1. For example, the decoder may obtain the first reference picture indicated by the first reference picture index from the reference picture list L0. The decoder may obtain the POC poc_RefPic0 of the first reference picture. Furthermore, the decoder may obtain the second reference picture indicated by the second reference picture index from the reference picture list L1. The decoder may obtain the POC poc_RefPic1 of the second reference picture.

In step S1002, the decoder may obtain a first POC difference pocDiff0 on the basis of the POC of the first reference picture and the POC of the current picture. pocDiff0 may be an absolute value of a value obtained by subtracting poc_curr from poc_RefPic0. Furthermore, the decoder may obtain a second POC difference pocDiff1 on the basis of the POC of the second reference picture and the POC of the current picture. pocDiff1 may be an absolute value of a value obtained by subtracting poc_curr from poc_RefPic1.

In step S1003, the decoder may compare the first POC difference and the second POC difference. The decoder may determine whether the first POC difference is larger than the second POC difference. In step S1003, when the first POC difference is larger than the second POC difference, the decoder may preferentially obtain the first motion vector offset corresponding to MV0. The decoder may correct MV0 on the basis of the first motion vector offset. Next, the decoder may obtain the second motion vector offset scaled from the first motion vector offset. Furthermore, the decoder may correct MV1 on the basis of the second motion vector offset.

When the first POC difference is not larger than the second POC difference in step S1003, the decoder may determine whether the first POC difference and the second POC difference are equal as in step S1004. In step S1004, when the first POC difference and the second POC difference are not equal, the decoder may preferentially obtain the second motion vector offset corresponding to MV1. The decoder may correct MV1 on the basis of the second motion vector offset. Next, the decoder may obtain the first motion vector offset scaled from the second motion vector offset. Furthermore, the decoder may correct MV0 on the basis of the first motion vector offset.

When the first POC difference and the second POC difference are equal in step S1004, the decoder may obtain the motion vector offset of MV0 corresponding to the reference picture list L0 earlier than the motion vector offset of MV1 corresponding to the reference picture list L1. For example, when the first POC difference and the second POC difference are equal, the decoder may determine a motion vector for which the motion vector offset is to be preferentially obtained, on the basis of values indicating reference picture lists corresponding to motion vectors. Here, the values indicating the reference picture lists may be indices for identifying each of the plurality of reference picture lists. For example, a reference picture list L(i) may be identified through a value i indicating a reference picture list. A value indicating the reference picture list L0 may be '0', and a value indicating the reference picture list L1 may be '1'. In detail, the decoder may preferentially obtain the motion vector offset of a motion vector corresponding to a reference picture list having a smaller value indicating a reference picture list. Therefore, when the first POC difference and the second POC difference are equal, the decoder may obtain the first motion vector offset earlier than the second motion vector offset. Here, the reference picture list L0 may be a list used in a first higher level region in which up to one motion vector is used for a specific sample and a second higher level region in which up to two motion vectors are used for a specific sample. Furthermore, the reference picture list L1 may be a list used only in the second higher level region in which up to two motion vectors are used for a specific sample. That is, the reference picture list L1 may be a list which is not used in the first higher level region in which up to one motion vector is used for a specific sample. Here, the higher level regions may represent a slice/tile or picture including the current block.

[Equation 1] indicates an embodiment of a method of determining a motion vector MV1 for which a motion vector offset is to be obtained first of all. The decoder may obtain an lth motion vector MV1 having the largest POC difference among MV0, MV1, MVk−1 according to [Equation 1]. In [Equation 1], POCi denotes the POC of a reference picture corresponding to an ith motion vector among k number of motion vectors, and POCcur denotes the POC of the current block.

$$l = \underset{i}{\mathrm{argmax}}\{abs(POC_i - POC_{cur})\} 0 \le i < k \qquad \text{[Equation 1]}$$

That is, through step S1003 and step S1004, the decoder may determine whether the first POC difference is larger than or equal to the second POC difference. When the first POC difference is larger than or equal to the second POC difference, the decoder may preferentially obtain the first motion vector offset corresponding to MV0. Furthermore, the decoder may correct MV0 on the basis of the first motion vector offset. Next, the decoder may obtain the second motion vector offset corresponding to MV1. Furthermore, the decoder may correct MV1 on the basis of the second motion vector offset.

On the contrary, when the first POC difference is less than the second POC difference, the decoder may preferentially obtain the second motion vector offset corresponding to MV1. Furthermore, the decoder may correct MV1 on the basis of the second motion vector offset. Next, the decoder may obtain the first motion vector offset corresponding to MV0. Furthermore, the decoder may correct MV0 on the basis of the first motion vector offset.

According to an additional embodiment, a plurality of merge motion vectors may be corrected on the basis of a size of each of the plurality of merge motion vectors. For example, the decoder may correct the plurality of merge motion vectors according to a priority order based on a result of comparing the sizes of the plurality of merge motion vectors. This is because as the size of a motion vector increases, a spatial distance between a reference block and a current block may increase, and thus the correlation may decrease. Referring to FIG. 10(b), the decoder may obtain an absolute value of each of MV0 and MV1. Next, the decoder may compare the absolute values of MV0 and MV1. When the absolute value of MV0 is larger than or equal to the absolute value of MV1, the decoder may obtain the first motion vector offset corresponding to MV0 earlier than the second motion vector offset corresponding to MV1. When the absolute value of MV0 is less than the absolute value of MV1, the decoder may obtain the second motion vector offset earlier than the first motion vector offset. [Equation 2] indicates an embodiment of a method of determining a motion vector MV1 for which a motion vector offset is to be preferentially obtained. In [Equation 2], MVi denotes an ith motion vector among k number of motion vectors.

$$l = \underset{i}{\mathrm{argmax}} |MV_i| 0 \le i < k \qquad \text{[Equation 2]}$$

Referring to FIG. 10(c), merge motion vectors may be corrected on the basis of the size of each of the merge motion vectors and the POC of a reference picture. First, the decoder may determine a motion vector for which the motion vector offset is to be preferentially obtained, on the basis of a result of comparing the first POC difference and the second POC difference. For example, the decoder may perform the above-described operations of steps S1001 to S1003. Next, when the first POC difference and the second POC difference are equal, the decoder may determine a motion vector for which the motion vector offset is to be preferentially obtained, on the basis of a result of comparing the absolute value of MV0 and the absolute value of MV1.

Figure 11:
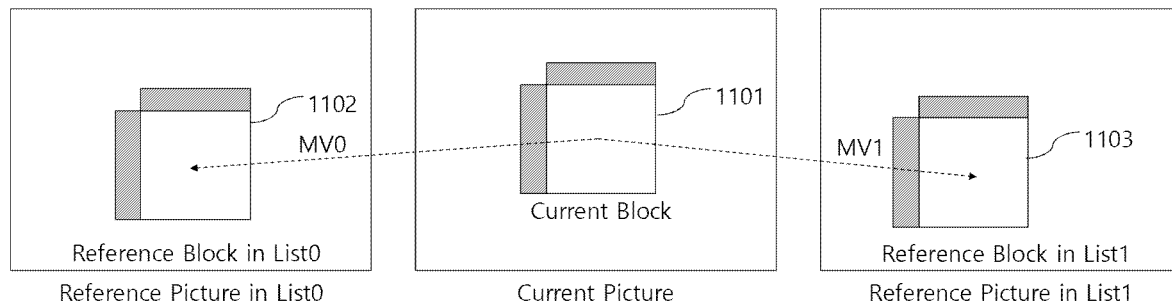
FIG. 11 is a diagram illustrating a method of correcting a motion vector according to another embodiment of the present invention.

FIG. 11 is a diagram illustrating a method of correcting a motion vector according to another embodiment of the present invention. According to an embodiment, the decoder may use a template matching method to determine a motion vector for which the motion vector offset is to be preferentially obtained among a plurality of motion vectors. Referring to FIG. 11, when a width of the current block is W and a height thereof is H, the decoder may configure an L-shaped template including a W0×H region on a left side of a target block and a W×H0 region on an upper side of the target block. At least one of W0 or H0 may be determined on the basis of the size of the current block. The decoder may configure the L-shaped template for each of a current block 1101, a first reference block 1102, and a second reference block 1103. Here, the first reference block 1102 may be a reference block specified by the motion vector MV0 of the reference picture list L0. Furthermore, the second reference block 1103 may be a reference block specified by the motion vector MV1 of the reference picture list L1.

Next, the decoder may determine a motion vector for which the motion vector offset is to be preferentially obtained among MV0 and MV1, on the basis of a value difference between a plurality of configured templates. In detail, the decoder may calculate a first template value difference between a template corresponding to MV0 and a template of the current block and a second template value difference between a template corresponding to MV1 and the template of the current block. The difference between values of templates may be calculated through the above-described SAD, mean-normalized SAD, or sum of squared error (SSE). When the first template value difference is larger than or equal to the second template value difference, the decoder may obtain the first motion vector offset corresponding to MV0 earlier than the second motion vector offset corresponding to MV1. When the first template value difference is less than the second template value difference, the decoder may obtain the second motion vector offset earlier than the first motion vector offset. [Equation 3] indicates an embodiment of a method of determining a motion vector MV1 for which a motion vector offset is to be preferentially obtained. In [Equation 3], cost_i denotes a value difference between a template of a reference block i and a template of a current block. In detail, the reference block i represents a reference block specified by an ith motion vector among k number of motion vectors.

$$l = \operatorname*{argmax}_{i} cost_i, 0 \leq i < k \quad \text{[Equation 3]}$$

According to an additional embodiment, the decoder may determine a motion vector for which the motion vector offset is to be preferentially obtained among a plurality of motion vectors, on the basis of a characteristic of a merge candidate. For example, when there is a motion vector scaled from a temporal candidate among a plurality of motion vectors corresponding to a merge target, the decoder may obtain, first of all, the motion vector offset of the motion vector scaled from the temporal candidate. Furthermore, when there is a zero motion vector among the plurality of motion vectors corresponding to the merge target, the decoder may obtain, first of all, the motion vector offset of the zero motion vector. The motion vector determination methods described with reference to FIG. 11 may be combined with the motion vector determination method described with reference to FIG. 10.

Meanwhile, the motion information set of the current block may be obtained using a method different from the above-described method using a merge candidate list. In this case, the motion vector of the current block may be obtained through a motion vector predictor (MVP) and a motion vector difference (mvd). The MVP of the current block may be signaled using an MVP candidate list. Furthermore, the reference picture index and the mvd of the current block may be separately signaled. The MVP candidate list may be obtained in a similar manner to that of the merge candidate list. This inter-prediction method may be referred to as an MVP mode.

According to an embodiment, the MVP candidate list may include at least one of a spatial candidate or a temporal candidate. Like the merge candidate list described above with reference to FIG. 9, the spatial candidate may be configured on the basis of available neighboring blocks among neighboring blocks of the current block. In detail, the decoder may sequentially search for A0, A1, scaled A0, and scaled A1 of FIG. 9 to generate up to one first spatial candidate. Next, the decoder may sequentially search for B0, B1, B2, scaled B0, and scaled B1 of FIG. 9 to generate up to one second spatial candidate. Here, scaled A0, scaled A1, scaled B0, and scaled B1 represent motion vectors obtained by scaling, according to a temporal relationship, motion vectors corresponding thereto respectively. For example, when A0 is available, A1 is not available, and the reference picture used for predicting A1 is different from the reference picture of the current picture, scaled A0 may be determined as the first spatial candidate. Here, the reference picture of the current picture may be a picture determined on the basis of the signaled reference picture index. Furthermore, the MVP candidate list may include up to one temporal candidate. The MVP candidate list may include a zero motion vector.

According to an embodiment, the encoder may signal the reference picture index, mvd, and MVP index indicating any one of candidates of the MVP candidate list. The decoder may use the motion vector of the candidate indicated by the MVP index as the MVP of the current block. The decoder may obtain the motion vector of the current block on the basis of the obtained MVP and received mvd. For example, the motion vector of the current block may have a value obtained by adding mvd to MVP. Next, the decoder may reconstruct the current block on the basis of the motion vector and the reference picture of the current block.

Figure 12:
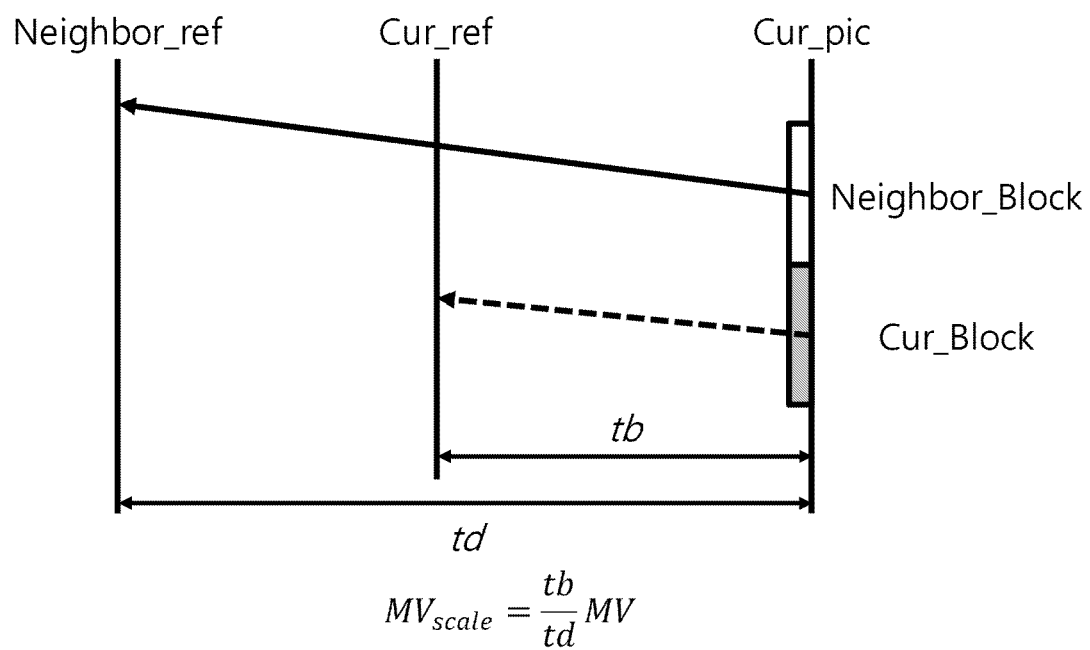
FIG. 12 is a diagram illustrating motion vector scaling of a candidate included in an MVP candidate list of a current block according to an embodiment of the present invention.

FIG. 12 is a diagram illustrating motion vector scaling of a candidate included in an MVP candidate list of a current block according to an embodiment of the present invention. Hereinafter, an MVP candidate block represents a candidate block corresponding to any one of candidates included in the MVP candidate list. Referring to FIG. 10, a first temporal distance tb between the current picture and a picture referenced by the current block may be obtained. Furthermore, a second temporal distance td between a picture including the MVP candidate block and a picture referenced by the MVP candidate block may be obtained. The decoder may scale a motion vector corresponding to the MVP candidate block on the basis of a value obtained by dividing the first temporal distance tb by the second temporal distance td. Here, the temporal distances tb and td may be expressed as a POC difference. Furthermore, the decoder may calculate tb and td using a fixed point method in order not to use a division operation. The fixed point method may be a method using an offset value and a shift operation.

Meanwhile, the above-described motion vector offset may be obtained by the decoder according to a predefined rule. According to an embodiment of the present invention, the decoder may obtain the motion vector offset on the basis of a template matching method. For example, the decoder may obtain the motion vector offset by searching for neighboring sample values on the basis of a block specified by a merge motion vector obtained through a merge index. Furthermore, the decoder may correct the merge motion vector on the basis of the obtained motion vector offset. In this manner, the signaling overhead may be reduced.

FIG. 13 is a diagram illustrating a method of correcting a motion vector according to an embodiment of the present invention. According to an embodiment, when the current block is a bi-prediction block, the decoder may correct a plurality of motion vectors used for the bi-prediction block. For example, when the current block is a bi-prediction block, a first initial motion vector MV0 corresponding to the first reference picture list L0 and a second initial motion vector MV1 corresponding to the second reference picture list L1 may be used for predicting the current block. Here, the initial motion vectors may represent a merge motion vector induced on the basis of the above-described merge index. The decoder may correct each of the first initial motion vector MV0 and the second initial motion vector MV1 to generate a first corrected motion vector MV0' and a second corrected motion vector MV1'.

According to an embodiment of the present invention, the first initial motion vector MV0 and the second initial motion vector MV1 may be corrected on the basis of a template matching method. The decoder may obtain a first template on the basis of a first reference block indicated by the first initial motion vector and a second reference block indicated by the second initial motion vector. For example, the first template may be an average for each sample between a first reference block P0 and a second reference block P1. That is, a specific sample of the first template may be expressed in a form of (p0+p1)/2. Here, p0 and p1 may be samples of corresponding locations in the first reference block P0 and the second reference block P1 respectively. Furthermore, the decoder may configure the first template using a bit shift operation such as (p0+p1)>>1. In this manner, the decoder may configure the first template without a division operation.

According to an additional embodiment, when a weighted prediction method is used for the current block, the first template may be a sum of each sample of weight value-applied first reference block and second reference block. In this case, the first template may be expressed as [Equation 4]. In [Equation 4], W0 and O0 may respectively denote a weight value and offset value applied to the reference block P0. Furthermore, W1 and O1 may respectively denote a weight value and offset value applied to the reference block P1. w_shift denotes a parameter for a bit shift operation. A method of determining the weight values and offset values will be described later with reference to FIGS. 18 to 25.

$T=(w0 \times P0+w1 \times P1+((O1+O2+1)<<w\_shift))>>$
$(w\_shift+1)$ [Equation 4]

Next, the decoder may correct the first initial motion vector and the second initial motion vector on the basis of the first template. According to an embodiment, the decoder may configure a first comparison target region on the basis of the first reference block indicated by the first initial motion vector. Furthermore, the decoder may compare the first template and a plurality of comparison target templates configurable within the first comparison target region. Here, the comparison target template may be configured to have the same size and shape as the first template. Furthermore, the comparison target template may be configured with pixels in units of integer pixels or subpels (½, ¼, ¹⁄₁₆-pel).

According to an embodiment, the decoder may determine a second template having a minimum value difference with the first template among the comparison target templates configurable within the first comparison target region. Furthermore, the decoder may generate the first corrected motion vector MV0' on the basis of the second template. In detail, the motion vector offset between the first initial motion vector MV0 and the first corrected motion vector MV0' may be a difference between a coordinate value indicating the location of the first reference block and a coordinate value indicating the location of the second template.

The difference between values of templates may be calculated through sum of absolute difference (SAD) or mean-normalized SAD. The SAD may be expressed as [Equation 5]. Furthermore, the mean-normalized SAD may be expressed as [Equation 6]. In [Equation 5] and [Equation 6], M denotes a width of a template or block, and N denotes a height of a template or block. Furthermore, T(x, y) denotes a sample of a template, and P(x, y) denotes a sample of a comparison target block. mean(X) may be a function for outputting a mean value of 'X'.

$SAD=\Sigma_{x=0}^{M-1}\Sigma_{y=0}^{N-1}|T(x,y)-P(x,y)|$ [Equation 5]

$SAD'=\Sigma_{x=0}^{M-1}\Sigma_{y=0}^{N-1}|T'(x,y)-P'(x,y)|$ [Equation 6]

$T'(x,y)=T(x,y)-\text{mean}(T(x,y))$, $P'(x,y)=P(x,y)-\text{mean}(P(x,y))$

According to a specific embodiment, the decoder may generate the first corrected motion vector MV0' on the basis of the second template that minimizes SAD or SAD' of the equations. Furthermore, the current block may be reconstructed on the basis of a reference block indicated by the first corrected motion vector MV0'.

The above-described method of generating the first corrected motion vector MV0' by correcting the first initial motion vector MV0 may be applied equally or equivalently to a method of generating the second corrected motion vector MV1' by correcting the second initial motion vector MV1.

FIG. 14 is a diagram illustrating a search location for correcting a motion vector on the basis of an initial motion vector according to an embodiment of the present invention. In FIG. 14(a), P0 indicates a sample location indicated by an initial motion vector. According to an embodiment of the present invention, the decoder may configure eight templates respectively corresponding to eight sample locations P1, P2, P3, P4, P5, P6, P7, and P8 adjacent to P0. Furthermore, the decoder may determine one template having a minimum value difference with the template of the current block generated on the basis of the initial motion vector, among the eight templates. Furthermore, the decoder may generate a motion vector corrected on the basis of a sample location corresponding to the one template.

For example, the initial motion vector indicating P0 may be expressed as a coordinate value (x, y). Here, when the value difference between the template of the current block and the template corresponding to P5 (location moved from P0 by +1 in the x-axis direction) is minimum, the decoder may correct the initial motion vector (x, y) into (x+1, y). According to another embodiment, when the value difference between the template of the current block and the template corresponding to P6 (location moved from P0 by −1 in the x-axis direction and by +1 in the y-direction) is minimum, the decoder may correct the initial motion vector (x, y) into (x−1, y+1). According to another embodiment, when the value difference between the template of the current block and the template corresponding to P0 is minimum, the initial motion vector may not be updated.

FIG. 14(b) illustrates an embodiment in which only some of the sample locations illustrated in FIG. 14(a) are searched for. According to an embodiment of the present invention, the decoder may perform template matching only on some of sample locations adjacent to P0. This is because when a template matching cost calculation is performed on all of the samples adjacent to P0, an amount of decoding computation may become excessive and decoding complexity may increase. In detail, motion vector correction may be performed on the basis of four templates respectively corresponding to four sample locations P2, P4, P5, and P7 adjacent to P0 in a vertical direction and in a horizontal direction. That is, templates respectively corresponding to sample locations P1, P3, P6, and P8 adjacent to P0 in a diagonal direction may be excluded from targets for a search.

According to another embodiment, the decoder may additionally perform template matching on any one of the sample locations P1, P3, P6, and P8 adjacent in a diagonal direction. According to a preset rule, the decoder may determine a sample location on which template matching is to be performed. For example, when the value difference between the template of the current block and the template corresponding to P2 is less than the value difference between the template of the current block and the template corresponding to P7, and the value difference between the template of the current block and the template corresponding to P5 is less than the value difference between the template of the current block and the template corresponding to P4, the decoder may perform template matching on P2, P4, P5, P7, and P3.

FIG. 13 illustrates the template for predicting the current block as having the same size as the width and height of the current block. According to another embodiment of the present invention, the template of the current block may be configured to be different in size and/or shape from the current block. For example, the size of the template of the current block may be extended compared to the size of the current block. In this manner, the accuracy of template matching may be improved.

Figure 15:
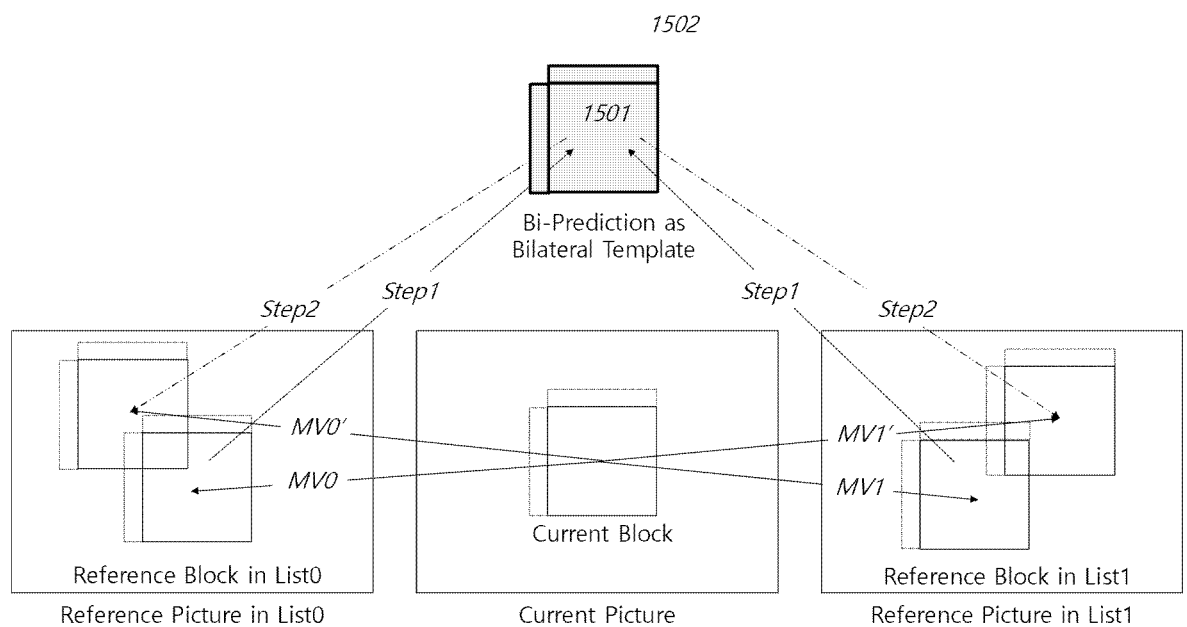
FIG. 15 is a diagram illustrating a method of configuring a template for correcting a motion vector according to an embodiment of the present invention.

FIG. 15 is a diagram illustrating a method of configuring a template for correcting a motion vector according to an embodiment of the present invention. According to an embodiment, the current block may have a width of W and a height of H. In this case, a reference block 1501 may be configured, which has the same shape as the current block having a width of W and a height of H on the basis of the sample location indicated by the initial motion vector. Furthermore, the reference block may be configured so that the sample location indicated by the initial motion vector becomes a top-left sample within the reference block. Here, a template 1502 may be configured, which has a shape in which a left boundary of the reference block 1501 and an upper boundary of the reference block are extended. In detail, a width W0 extended from the left boundary of the reference block 1501 towards the outside of the block and a height H0 extended from the upper boundary of the reference block 1501 towards the outside of the block may be determined on the basis of the size of the reference block 1501. Even when the decoder uses an extended template, the decoder may correct the initial motion vector using a method that is the same as or equivalent to the methods described with reference to FIGS. 13 and 14.

Figure 16:
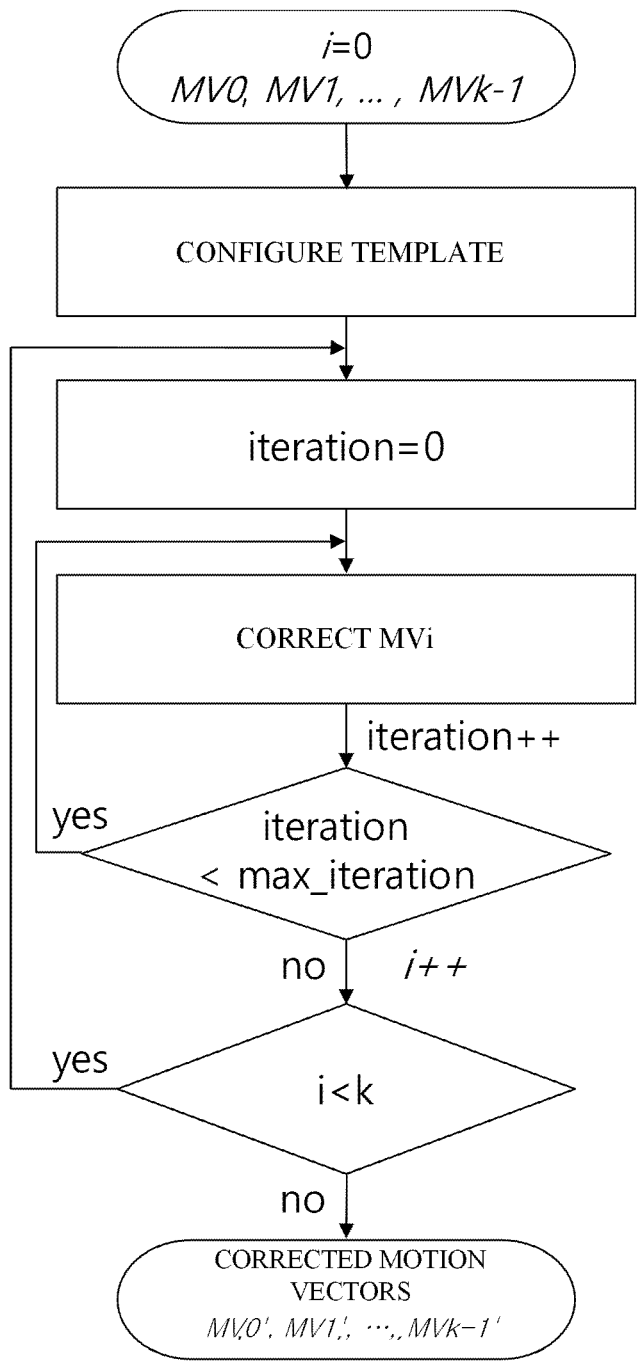
FIG. 16 is a flowchart illustrating a method of correcting a motion vector according to an embodiment of the present invention.

FIG. 16 is a flowchart illustrating a method of correcting a motion vector according to an embodiment of the present invention. As described above, the current block may be predicted on the basis of a plurality of motion information sets. In the embodiment of FIG. 16, the current block may be predicted on the basis of k number of motion vectors. The decoder may correct the k number of motion vectors using a template matching method. Furthermore, the decoder may generate a final prediction block of the current block on the basis of the k number of corrected motion vectors. Hereinafter, a method of correcting k number of initial motion vectors will be described in detail.

According to an embodiment, the template of the current block may be configured on the basis of a plurality of reference blocks respectively corresponding to initial motion vectors MV0, MV1, . . . , MVk−1. Next, MV0, MV1, . . . , MVk−1 may be corrected on the basis of the template of the current block. For example, the decoder may generate MV0' on the basis of a template having a minimum value difference with the template of the current block, among comparison target templates within a comparison target region configured on the basis of MV0. Here, the decoder may generate a corrected motion vector while increasing an iteration number for each initial motion vector. A reference motion vector for configuring the comparison target region may be changed according to the iteration number.

In detail, the plurality of comparison target templates respectively corresponding to the plurality of sample locations, described with reference to FIG. 14, may be configured on the basis of the sample location indicated by the reference motion vector in each iteration. Here, the reference motion vector of current iteration may be a motion vector corrected through previous iteration. When the iteration number is '0', the reference motion vector may be an initial motion vector. In each iteration, the decoder may calculate a value difference between the template of the current block and each of the plurality of comparison target templates. Furthermore, the decoder may generate a corrected motion vector of current iteration on the basis of the comparison target template having a minimum value difference with the template of the current block. Next, when the current iteration number is less than a preset maximum iteration number max_iteration, the decoder may perform template matching of next iteration on the basis of the corrected motion vector of current iteration. The initial motion vector may be repeatedly corrected until the iteration number reaches the preset maximum iteration number max_iteration through the above-described method.

According to an additional embodiment, motion vector correction may be performed in units of integer pixels or subpels (½, ¼, 1/16-pel). First, the decoder may generate a motion vector MVi' corrected in units of integer pixels from an ith initial motion vector MVi. Next, the decoder may update a motion vector of subpel unit using the motion vector MVi' corrected in units of integer pixels as a reference motion vector. Here, the decoder may configure templates respectively corresponding to a plurality of sample locations of subpel unit, which are adjacent to P0, in the same manner as that for correcting a motion vector in units of integer pixels. Furthermore, the decoder may perform motion vector correction of subpel unit on the basis of the configured template.

According to the above-described motion vector correction method based on template matching, the decoder repeatedly accesses a memory, and thus the complexity of the decoder may increase. Therefore, to suppress an increase in the complexity of the decoder, a method of correcting a plurality of motion vectors on the basis of one offset may be used. In this case, when the motion vector offset of a first initial motion vector for which the motion vector offset is obtained first of all among a plurality of initial motion vectors is '0', the other initial motion vectors may not be corrected either. Here, a target for which the motion vector offset is to be obtained first of all among the plurality of initial motion vectors may be determined using the method described above with reference to FIGS. 10 and 11.

Figure 17:
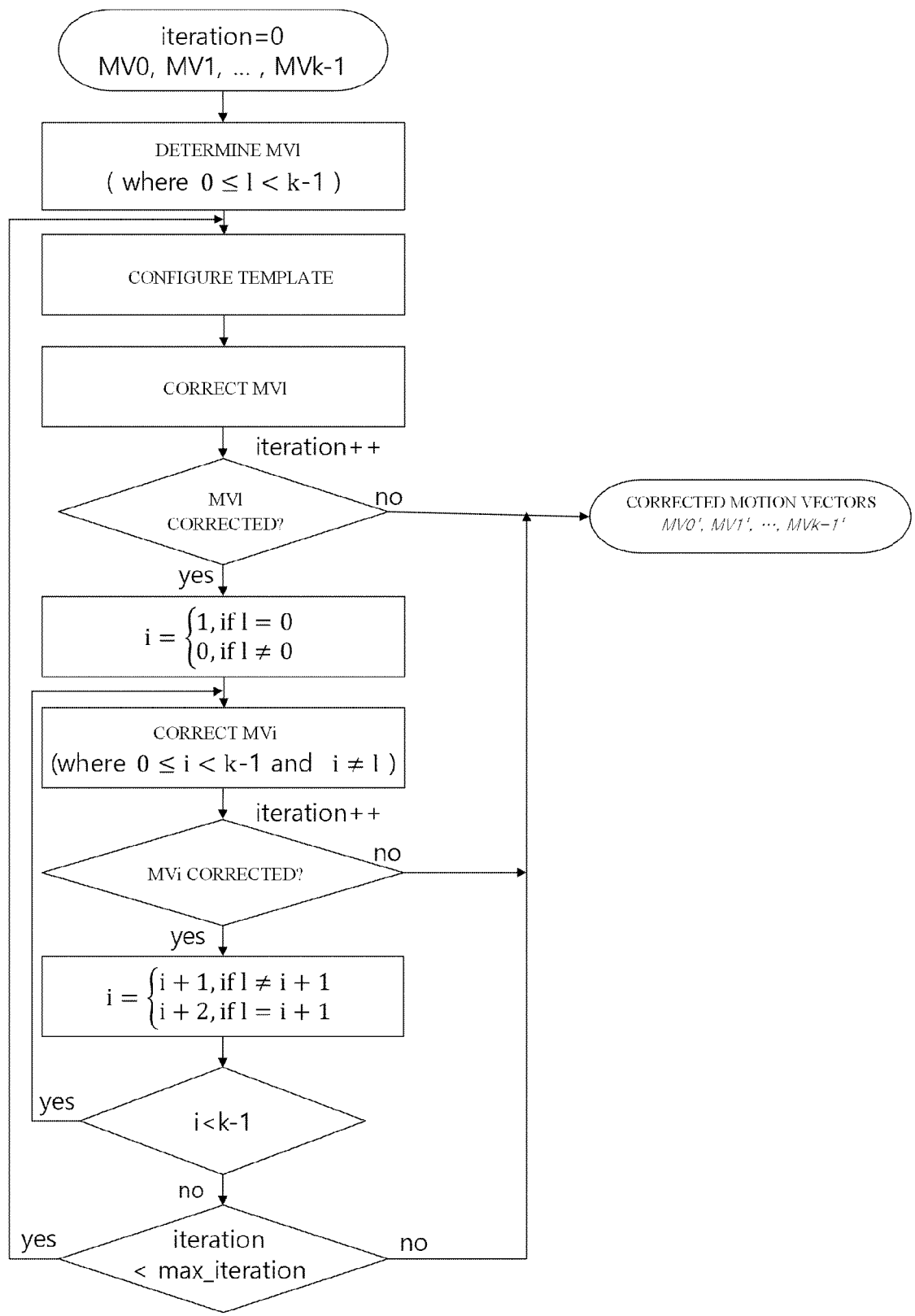
FIG. 17 is a flowchart illustrating a method of correcting a motion vector according to another embodiment of the present invention.

FIG. 17 is a flowchart illustrating a method of correcting a motion vector according to another embodiment of the present invention. As described above, the current block may be predicted on the basis of a plurality of motion information sets. In the embodiment of FIG. 17, the current block may be predicted on the basis of k number of motion vectors.

First, the decoder may determine a motion vector for which the motion vector offset is to be preferentially determined. A target for which the motion vector offset is to be obtained first of all among the plurality of initial motion vectors may be determined using the method described above with reference to FIGS. 10 and 11. Referring to FIG. 17, the decoder may determine MV1 for which the motion vector offset is to be obtained first of all.

Next, the decoder may correct MV1 according to the method described above with reference to FIG. 16. For example, the template of the current block may be configured on the basis of a plurality of reference blocks respectively corresponding to initial motion vectors MV0, MV1, . . . , MVk−1. Furthermore, the decoder may obtain the motion vector offset corresponding to MV1 on the basis of a template having a minimum value difference with the template of the current block, among comparison target templates within a comparison target region configured on the basis of MV1. The decoder may generate MV1' on the basis of the motion vector offset corresponding to MV1.

Next, the decoder may determine whether MV1 has been corrected. When MV1 has not been corrected, the decoder may predict the current block using the initial motion vectors MV0, MV1, . . . , MVk−1 as a final motion vector. This is because the motion vector offset corresponding to MV1 is '0'. On the contrary, when MV1 has been corrected, the decoder may sequentially correct the initial motion vectors except for MV1 as illustrated in FIG. 16. For example, when 1 is 2, and MV2 has been corrected, correction may be sequentially performed on MV0, MV1, MV3, . . . , MVk−1 except for MV2.

Furthermore, during a process of sequentially correcting the initial motion vectors except for MV1, when an ith motion vector has not been corrected, the decoder may end the motion vector correction early. For example, the decoder may predict the current block using corrected motion vectors for MV1 and motion vectors before (i+1)th motion vector and using an initial motion vector for motion vectors from (i+1)th motion vector to kth motion vector.

According to an additional embodiment, when all of k number of initial motion vectors have been corrected, and the iteration number is less than the maximum iteration number max_iteration, the decoder may update the template of the current block. In this case, the decoder may update the template of the current block on the basis of a plurality of reference blocks respectively corresponding to corrected motion vectors. That is, the template of the current block which is used in the current iteration may be updated repeatedly as much as the maximum iteration number max_iteration using motion vectors corrected through previous iteration. According to another embodiment, a method of early ending a correction algorithm may be configured not to be used in an initial correction round according whether MV1 or other motion vectors are corrected. Whether to use early ending may be adaptively determined according to the size of the current block.

Hereinafter, a weighted prediction method for applying a weight value and an offset value to a reference block according to an embodiment of the present invention will be described.

Figure 18:
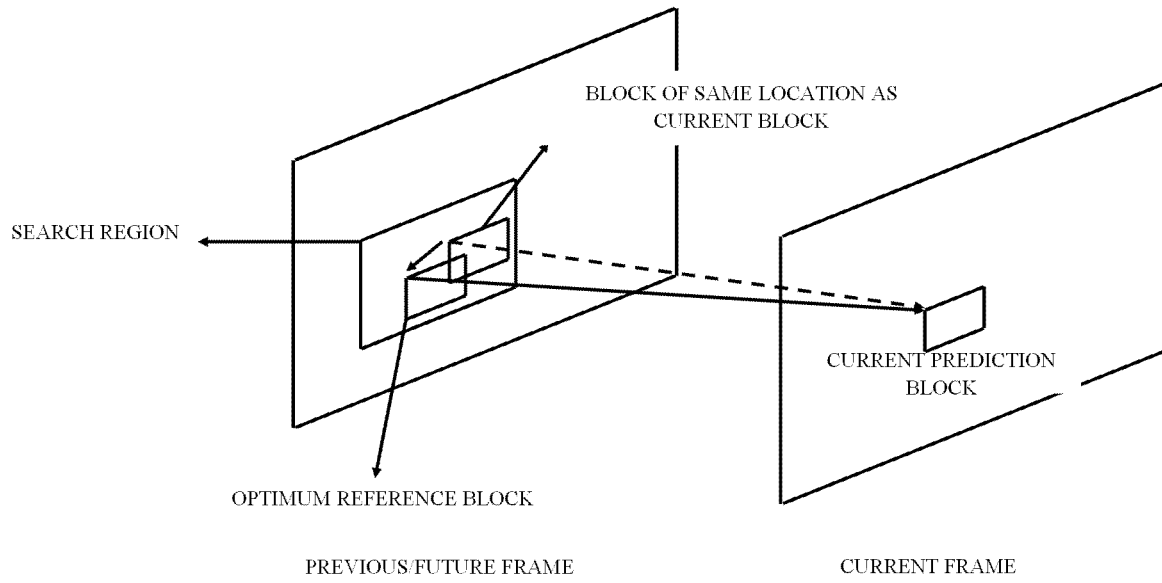
FIG. 18 is a diagram illustrating a weighted prediction method using one motion information set according to an embodiment of the present invention.

FIG. 18 is a diagram illustrating a weighted prediction method using one motion information set according to an embodiment of the present invention. As described above, a reference block used for inter-prediction of the current block may be determined using a method of searching for a block having high similarity to the current block in a picture having a different POC from that of a current picture. Here, the picture having a different POC from that of the current picture may be a past-direction picture, the POC of which precedes that of the current picture, or a future-direction picture, the POC of which follows that of the current picture. Here, the block having high similarity to the current block may be searched for in units of integer pixels or subpels (½, ¼, ¹⁄₁₆-pel).

According to an embodiment of the present invention, the motion information set of a specific block may include bi-prediction information. Here, the bi-prediction information may be information indicating whether the corresponding block is a block predicted using both of two reference picture lists. For example, the encoder may signal the bi-prediction information. Furthermore, the motion information set may include a reference picture list, a reference picture index, and a motion vector. In the embodiments described below with reference to FIGS. 18 to 26, the motion vector and the initial motion vector may represent merge motion vectors induced on the basis of a merge index from the above-described merge candidate list.

According to an additional embodiment, the motion information set may include uni/bi-directional information. The uni/bi-directional information may be information indicating whether the corresponding block has been predicted on the basis of either a past-direction picture or future-direction picture on the basis of the POC of the current picture or has been predicted on the basis of a bi-directional picture.

According to an embodiment of the present invention, the decoder may predict the current block using a weighted prediction method for applying a weight value and an offset value to a reference block. Here, the weighted prediction method may be divided into a first weighted prediction method and a second weighted prediction method. First, in the first weighted prediction method, information indicating usage/non-usage of weighted prediction and a weight parameter set may be signaled in units of PPS. Hereinafter, the weight parameter set may be used as a term including at least one of a weight value or an offset value applied to a reference block. Next, in the second weighted prediction method, information indicating usage/non-usage of weighted prediction may be signaled in units of SPS. Furthermore, in the second weighted prediction method, a weight parameter set may be signaled for each coding unit. The first weighted prediction method and the second weighted prediction method may not be redundantly applied to one coding unit. For example, the second weighted prediction method may be applied to coding units included in a picture to which the first weighted prediction method is not applied.

According to an embodiment, the second weighted prediction method may be applied only when the size of a coding unit is larger than a preset size or the number of samples of a coding unit is larger than a preset number. In the second weighted prediction method, a weight value may be indicated trough an index gbi_idx[x0][y0] of a pre-configured table. Information indicating usage/non-usage of weighted prediction for uni-prediction may be indicated with weighted_pred_flag. Information indicating usage/non-usage of weighted prediction for bi-prediction may be indicated with weighted_bipred_flag. Although embodiments of the present invention are described below on the basis of the first weighted prediction method, the present disclosure is not limited thereto. The above-described second weighted prediction method may be applied equally or equivalently to the embodiments described below.

In FIG. 18, P0 denotes a sample value of a reference block, W0 denotes a weight value, and O0 denotes an offset value. Furthermore, Wshift denotes a parameter for a bit shift operation. The decoder may obtain information indicating usage/non-usage of weighted prediction on the basis of a received bitstream. Furthermore, the decoder may predict the current block on the basis of the information indicating usage/non-usage of weighted prediction.

Figure 19:
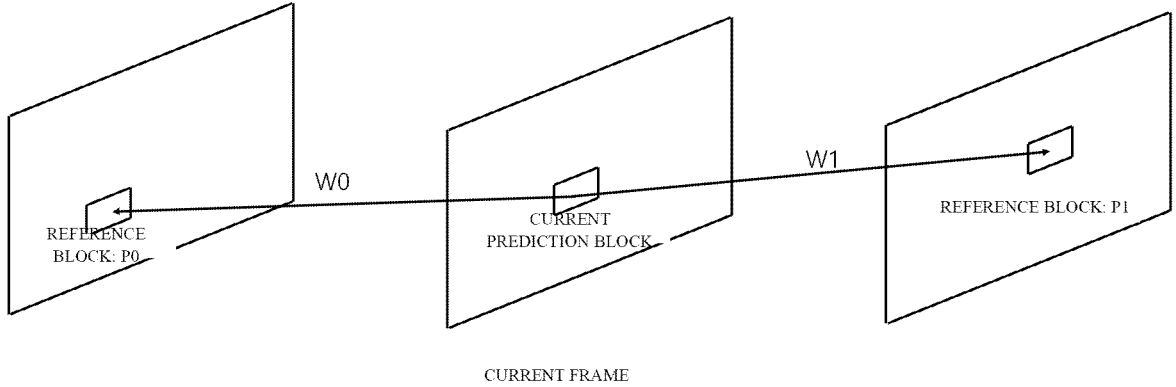
FIG. 19 is a diagram illustrating a weighted prediction method of a bi-predicted block according to an embodiment of the present invention.

FIG. 19 is a diagram illustrating a weighted prediction method of a bi-predicted block according to an embodiment of the present invention. According to an embodiment of the present invention, the current block may be predicted on the basis of the reference block P0 included in a picture based on the first reference picture list L0 and the reference block P1 included in a picture based on the second reference picture list L1. In FIG. 19, W0 and O0 may respectively denote a weight value and offset value applied to the reference block P0. Furthermore, W1 and O1 may respectively denote a weight value and offset value applied to the reference block P1. Wshift denotes a parameter for a bit shift operation. The decoder may obtain the corresponding information on the basis of a bitstream and may predict the current block.

Figure 20:
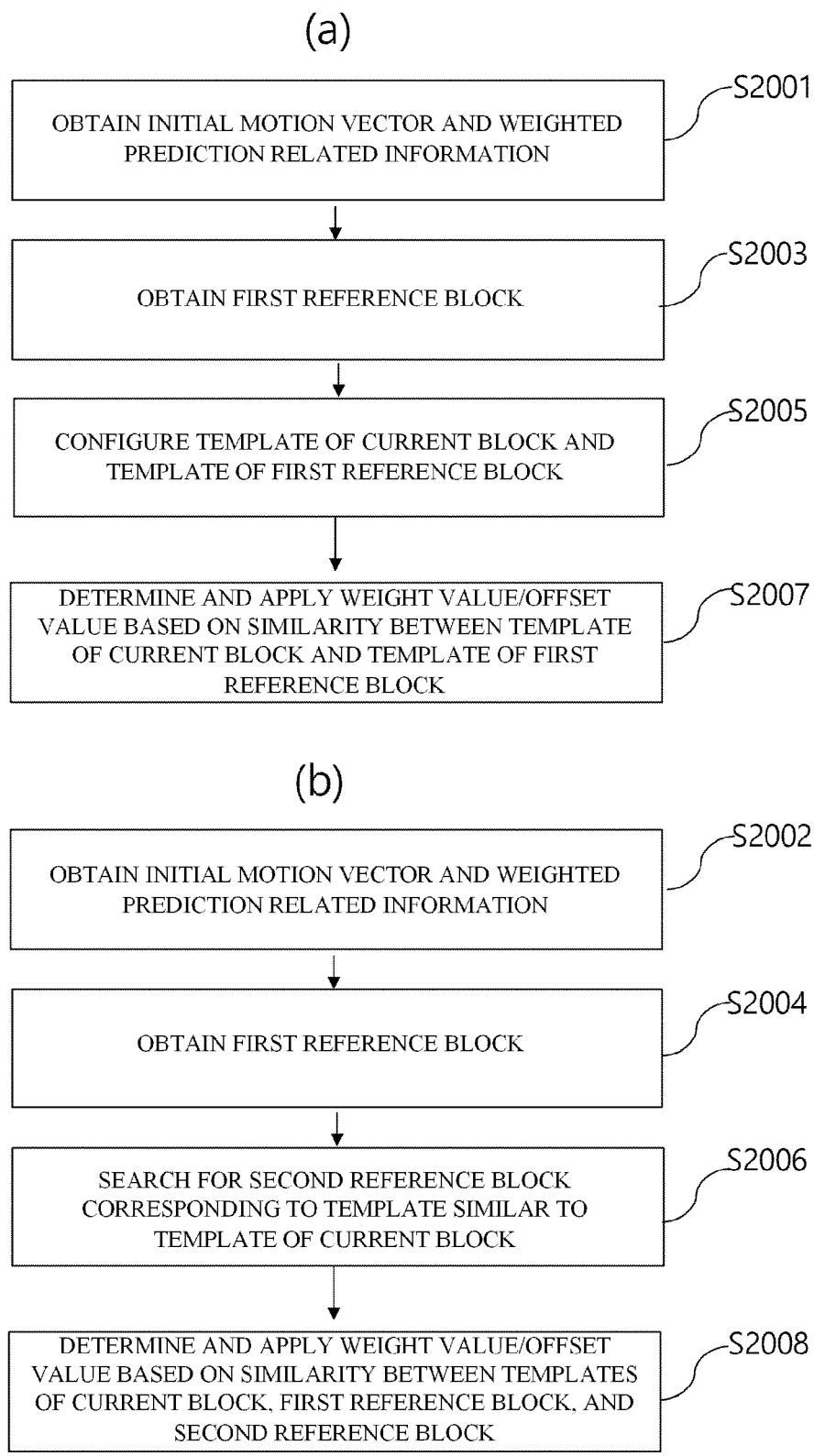
FIG. 20 is a flowchart illustrating a method for a decoder to predict a current block using weighted prediction according to an embodiment of the present invention.

FIG. 20 is a flowchart illustrating a method for a decoder to predict a current block using weighted prediction according to an embodiment of the present invention. In step S2001 of FIG. 20(a), the decoder may obtain an initial motion vector and weighted prediction related information. Here, the decoder may obtain the initial motion vector and weighted prediction related information from a received bitstream. In step S2003, the decoder may obtain a first reference block on the basis of the initial motion vector and weighted prediction related information obtained in step S2001. In step S2005, the decoder may configure the template of the current block and the template of the first reference block.

In step S2007, the decoder may determine a weight parameter set to be applied to the first reference block using a template matching method. For example, the decoder may determine the weight parameter set to be applied to the first reference block on the basis of the value difference between the template of the current block and the template of the first reference block. Furthermore, the decoder may generate an inter-predicted prediction block by applying the determined weight parameter set to the first reference block. Meanwhile, according to whether the inter-prediction method of the current block is bi-prediction, similarity determined on the basis of at least one of additional information about a value difference between templates or a value difference between a plurality of reference blocks may be used for predicting the current block.

Step S2002 and step S2004 of FIG. 20(b) may be the same as step S2001 and step S2003 of FIG. 20(a). The decoder may obtain an initial motion vector and weighted prediction related information, and may obtain a first reference block on the basis of the initial motion vector and weighted prediction related information. In step S2006, the decoder may perform a search for determining a second reference block on the basis of the template of the current block. For example, the decoder may determine the second reference block on the basis of the template of the current block and additional information. In detail, the additional information may be the template of a comparison target block. The decoder may configure a comparison target region on the basis of the first reference block. In this case, the decoder may configure the template of a specific comparison target block in the comparison target region. Furthermore, when the value difference between the template of the specific comparison target block and the template of the current block is equal to or less than a preset value, the decoder may use the specific comparison target block as the second reference block.

In step S2008, the decoder may determine a weight parameter set to be applied to each of the first reference block and the second reference block using a template matching method. For example, the decoder may determine the weight parameter set to be applied to each of the first reference block and the second reference block using the template of the current block, the template of the first reference block, and the template of the second reference block. In detail, the decoder may determine the weight parameter set to be applied to each of the first reference block and the second reference block on the basis of the value difference between the template of the current block and the template of the first reference block or the value difference between the template of the current block and the template of the second reference block. In addition, the decoder may determine the weight parameter set to be applied to each of the first reference block and the second reference block on the basis of a sample of each of the current block, the first reference block, and the second reference block.

FIG. 21 is a diagram illustrating a method of updating a weight parameter set to be applied to a reference block when a current block is uni-predicted according to an embodiment of the present invention. According to an embodiment of the present invention, the decoder may configure the template of the current block on the basis of neighboring samples of the current block. Hereinafter, the template of the current block may be referred to as a first template. Although FIG. 21 illustrates that the template of the current block is configured using upper and left neighboring samples of the current block, the present disclosure is not limited thereto.

Furthermore, the decoder may determine a first reference block on the basis of the motion vector MV0 of the current block. The decoder may configure a second template which is the template of the first reference block on the basis of the neighboring samples of the first reference block. The second template may be configured using a method that is the same as or equivalent to the method of configuring the template of the current block.

Next, the decoder may calculate the value difference between the first template and the second template. Here, the value difference between the templates may be a value determined using either SAD or SATD. According to an additional embodiment, the value difference between the templates may be a value determined on the basis of a ratio between a sum of sample values of all of the samples included in the first template and a sum of sample values of all of the samples included in the second template.

The decoder may update the weight parameter set on the basis of the value difference between the templates determined using the above-described method. For example, when a signaled weight value is a first weight value W0, the decoder may change the first weight value W0 to a second weight value W0' on the basis of the value difference between the templates. In detail, the decoder may compare the value difference between the first template and the second template with a preset value. Furthermore, the decoder may change the first weight value W0 to the second weight value W0' on the basis of a comparison result. The decoder may change the first weight value W0 to the second weight value W0' that is a weight value corresponding to the value difference between the templates, on the basis of a predefined table. Here, the predefined table may be a common table shared between the encoder and the decoder. Next, the decoder may generate a prediction block of the current block by applying the second weight value W0' to a sample value of a first reference block. Furthermore, the decoder may reconstruct the current block on the basis of the prediction block.

According to an additional embodiment, the decoder may determine the weight parameter set to be applied to the first reference block using a linear model between the first template and the second template. In detail, the decoder may generate a linear model that minimizes the difference between sample values for each of the locations of samples in the first template and the second template. For example, when the linear model is y=ax+b, the decoder may apply a weight value 'a' and an offset value 'b' to the first reference block. Furthermore, in the linear model, x and y may respectively correspond to sample values of the second template and sample values of the first template. Furthermore, the decoder may use a linear/nonlinear regression model instead of the linear model.

According to an additional embodiment, the decoder may determine the weight parameter set corresponding to the value difference between templates obtained on the basis of the predefined table. According to an additional embodiment, the offset value applied to the first reference block may be updated with an offset value within a preset range according to a weight value and a variation in a motion vector.

According to an additional embodiment, whether to use the weighted prediction method may be determined according to the value difference between the first template and the second template. For example, when the value difference between the templates is equal to or less than a preset value, the weighted prediction method may not be used. On the contrary, when the value difference between the templates is at least the preset value, the weighted prediction method may be used.

Although FIG. 21 illustrates a method of updating the weight parameter set applied to the first reference block, the motion vector of the current block may also be corrected using a method that is the same as or equivalent to the method of updating the weight parameter set. According to an embodiment of the present invention, the motion vector correction described with reference to FIGS. 9 to 17 may be performed with the above-described update of the weight parameter set.

For example, the decoder may update at least one of the motion vector of the current block, the weight value applied to a reference block, and the offset value applied to a reference block. The decoder may update at least one of the motion vector of the current block, the weight value applied to a reference block, and the offset value applied to a reference block on the basis of the template of the current block and the template of a reference block.

FIG. 22 is a diagram illustrating a method of predicting a current block on the basis of an additionally searched-for reference block according to an embodiment of the present invention. According to an embodiment of the present invention, the encoder may signal an additional reference flag indicating presence of an additional reference block having higher similarity to the current block than the first reference block indicated by the motion vector MV0 of the current block. Here, the additional reference flag may be 1 bit. The decoder may determine whether to correct the motion vector of the current block on the basis of the additional reference flag. For example, when the additional reference flag is deactivated, the decoder may generate a prediction block of the current block on the basis of the first reference block.

On the contrary, when the additional reference flag is activated, the decoder may correct the motion vector of the current block by searching for an additional reference block that is more similar to the current block than the first reference block. That is, the decoder may obtain a corrected motion vector MV0" indicating the additional reference block other than the first reference block in a reference picture. Here, the additional reference block may be searched for on the basis of the location of the first reference block. For example, the decoder may configure a comparison target region on the basis of the location of the first reference block. In this case, the decoder may configure the template of a specific comparison target block in the comparison target region. Furthermore, the decoder may compare the template of the specific comparison target block and the template of the current block, and, when the difference therebetween is equal to or less than a preset value, the decoder may use the specific comparison target block as the additional reference block.

Referring to FIG. 22, the decoder may compare the template of each of comparison target blocks in the comparison target region and a first template to obtain a second reference block having a minimum value difference between templates. Here, the decoder may obtain the second reference block having a minimum value difference between templates in units of integer pixels, ½-pel, ¼-pel, or ¹⁄₁₆-pel. Furthermore, when the weighted prediction method is used for the current block, the decoder may obtain the weight parameter set to be applied to the second reference block on the basis of the value difference between the first reference block and the second reference block. For example, the decoder may determine a weight value W0" to be applied to the second reference block on the basis of the value difference between the first reference block and the second reference block. Here, the method of determining the value difference between templates and the weighted prediction method based on the value difference between templates, described with reference to FIG. 21, may be equally or equivalently applied. For example, the decoder may determine the weight value W0" to be applied to the second reference block on the basis of the value difference between at least two among a first template of the current block, a second template of the first reference block, and a third template of the second reference block.

Furthermore, the decoder may predict the current block on the basis of at least one of the first reference block or the second reference block. For example, the decoder may generate a first prediction block of the current block by applying a first weight value W0 to a sample value of the first reference block. Furthermore, the decoder may generate a second prediction block of the current block by applying a second weight value W0" to a sample value of the second reference block. Furthermore, the decoder may reconstruct the current block on the basis of at least one of the first prediction block or the second prediction block.

According to an additional embodiment, the decoder may determine whether to use the weighted prediction method by comparing a preset value and a variation in the corrected motion vector MV0" indicating the second reference block relative to the initial motion vector MV0. Furthermore, whether to update the weight parameter set may be determined according to the variation in the corrected motion vector MV0" indicating the second reference block relative to the initial motion vector MV0.

Figure 23:
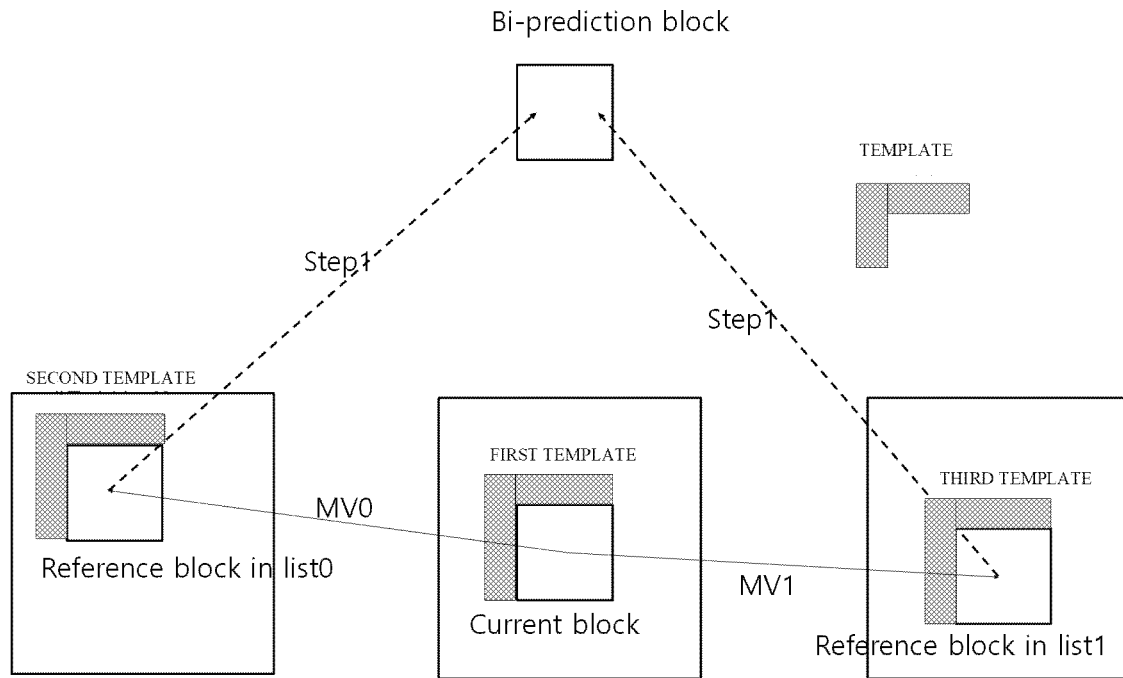
FIG. 23 is a diagram illustrating a method of updating a weight parameter set to be applied to a reference block when a current block is a bi-predicted block according to an embodiment of the present invention.

FIG. 23 is a diagram illustrating a method of updating a weight parameter set to be applied to a reference block when a current block is a bi-predicted block according to an embodiment of the present invention. According to an embodiment of the present invention, when the current block is a bi-predicted block, the decoder may predict the current block on the basis of two motion information sets. Here, a first motion information set corresponding to the reference picture list L0 may include the first motion vector MV0. Furthermore, a second motion information set corresponding to the reference picture list L1 may include the second motion vector MV1.

According to an embodiment of the present invention, the decoder may predict the current block on the basis of a first reference block indicated by the first motion vector MV0 and a second reference block indicated by the second motion vector MV1. For example, the decoder may configure a first template of the current block, a second template of the first reference block, and a third template of the second reference block using the method described above with reference to FIGS. 18 to 22. Next, the decoder may determine a first template value difference by comparing the first template and the second template. Furthermore, the decoder may determine a second template value difference by comparing the first template and the third template. Next, the decoder may determine a first parameter set to be applied to the first reference block on the basis of the first template value difference. Furthermore, the decoder may determine a second parameter set to be applied to the second reference block on the basis of the second template value difference. Next, the decoder may reconstruct the current block on the basis of the first parameter set and the second parameter set.

Figure 24:
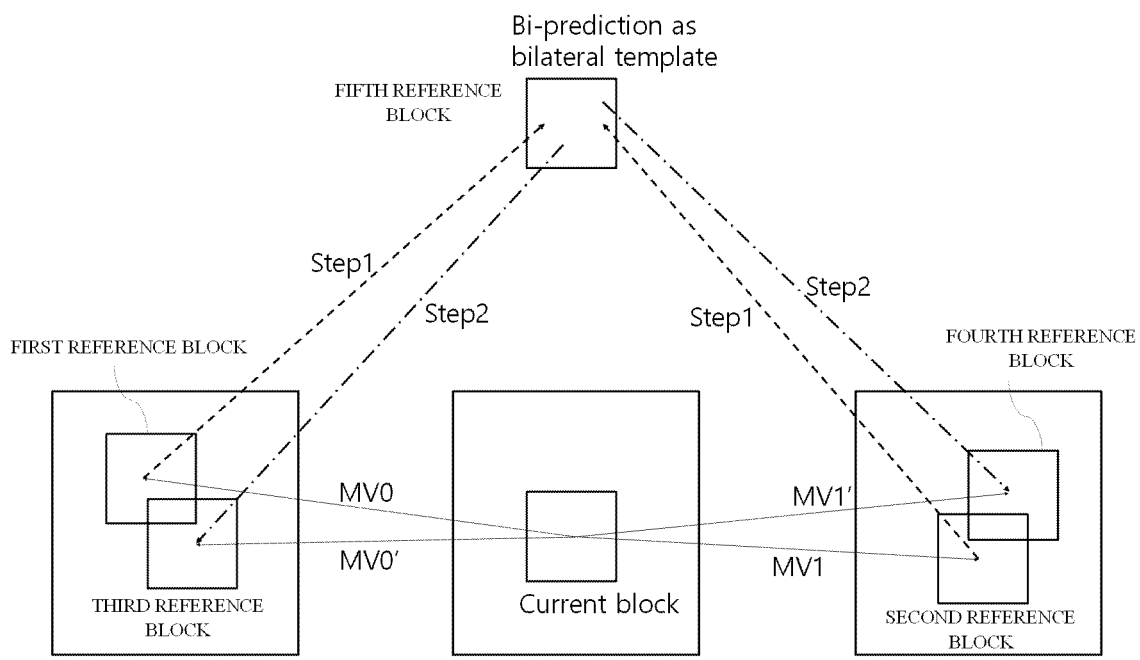
FIG. 24 is a diagram illustrating a method of predicting a current block on the basis of an additionally searched-for reference block when the current block is a bi-predicted block according to an embodiment of the present invention.

FIG. 24 is a diagram illustrating a method of predicting a current block on the basis of an additionally searched-for reference block when the current block is a bi-predicted block according to an embodiment of the present invention. According to an embodiment of the present invention, the current block may be predicted on the basis of a reference block generated by a plurality of reference blocks. First, the decoder may obtain a first reference block and a second reference block on the basis of initial motion vectors MV0 and MV1 for the current block. Next, the decoder may generate a fifth reference block on the basis of the first reference block and the second reference block. For example, the decoder may generate the fifth reference block or an average for each sample of the first reference block and the second reference block.

Next, the decoder may correct an initial motion vector on the basis of sample values of the fifth reference block. For example, the decoder may search for a block having a sample value similar to that of the fifth block from each of a first reference picture and a second reference picture. Here, the first reference picture and the second reference picture may respectively correspond to the initial motion vectors (MV0, MV1). By performing the search, the decoder may obtain a third reference block which is most similar to a fifth reference block from the first reference picture and a fourth reference block which is most similar to the fifth reference block from the second reference picture. According to an embodiment, the decoder may correct the initial motion vector MV0 into MV0' on the basis of the location of the third reference block. Furthermore, the decoder may correct the initial motion vector MV1 into MV1' on the basis of the location of the fourth reference block.

Next, the decoder may determine whether to perform weighted prediction or determine a parameter set to be applied to a third reference sample and a parameter set to be applied to a fourth reference sample, on the basis of at least one of the value difference between the fifth reference block and the third reference block or the value difference between the fifth reference block and the fourth reference block. Next, the decoder may reconstruct the current block on the basis of the parameter set to be applied to the third reference sample and the parameter set to be applied to the fourth reference sample.

Figure 25:
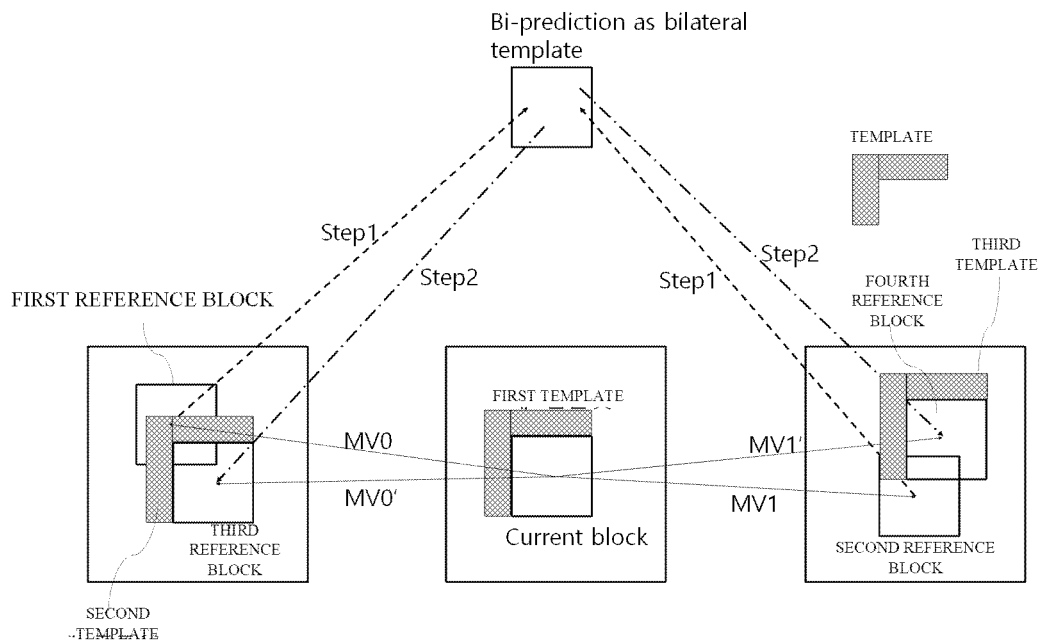
FIG. 25 is a diagram illustrating a method of predicting a current block on the basis of an additionally searched-for reference block when the current block is a bi-predicted block according to another embodiment of the present invention.

FIG. 25 is a diagram illustrating a method of predicting a current block on the basis of an additionally searched-for reference block when the current block is a bi-predicted block according to another embodiment of the present invention. First, the decoder may obtain a first reference block and a second reference block on the basis of initial motion vectors MV0 and MV1 for the current block. Next, the decoder may generate a fifth reference block on the basis of the first reference block and the second reference block. For example, the decoder may generate the fifth reference block using an average for each sample of the first reference block and the second reference block or a sum of each sample of weight value-applied first reference block and second reference block.

Next, the decoder may correct an initial motion vector on the basis of sample values of the fifth reference block. Here, the first reference picture and the second reference picture may respectively correspond to the initial motion vectors MV0 and MV1. By performing the search, the decoder may obtain a third reference block which is most similar to a fifth reference block from the first reference picture and a fourth reference block which is most similar to the fifth reference block from the second reference picture.

Next, the decoder may configure a first template configured with neighboring samples of the current block. Furthermore, the decoder may configure a second template configured with neighboring samples of the third reference block and a third template configured with neighboring samples of the fourth reference block. Next, the decoder may determine a parameter set to be applied to a third reference sample and a parameter set to be applied to a fourth reference sample, on the basis of the value difference between two among the first template, the second template, and the third template. Next, furthermore, the decoder may reconstruct the current block on the basis of the parameter set to be applied to the third reference sample and the parameter set to be applied to the fourth reference sample.

According to an embodiment of the present invention, efficient methods for signaling a motion information set used for inter-prediction may be provided. According to an embodiment, the motion information set of a current block may be induced on the basis of the motion information set used for predicting neighboring blocks of the current block, such as the above-described merge mode, skip mode, and MVP mode.

As described above, the motion vector of the current block may be determined on the basis of a motion vector predictor and a motion vector difference value. For example, the decoder may obtain the motion vector of the current block by adding the motion vector difference value to the motion vector predictor. According to an embodiment, the encoder and the decoder may determine the motion vector predictor according to a rule predefined between the encoder and the decoder. Furthermore, the encoder may obtain the motion vector difference value on the basis of the determined motion vector predictor. Furthermore, the encoder may signal the obtained motion vector difference value. The decoder may obtain a motion vector on the basis of the determined motion vector predictor and the motion vector difference value. In cases when the motion vector difference value rather than a motion vector is signaled as in the above-described method, bits for obtaining a motion vector may be reduced.

The above-described motion vector predictor may be obtained on the basis of a motion vector predictor candidate list. Here, the motion vector predictor candidate list may be configured with a spatial predictor candidate and a temporal predictor candidate. Furthermore, the encoder and the decoder may configure the motion vector predictor candidate list on the basis of a rule predefined between the encoder and the decoder.

According to an embodiment of the present invention, candidates in the above-described merge candidate list and/or motion vector predictor candidate list (hereinafter referred to as candidate list) may be reordered. That is, an index indicating candidates in the candidate list may be redefined. In the present disclosure, reordering the candidates in the candidate list may be referred to as motion candidate reorder (MCR). The motion candidate reorder may be performed according to a reordering rule predefined by each of the encoder and the decoder. In this manner, the encoder and the decoder according to an embodiment of the present invention may improve the encoding efficiency of a video signal.

According to an embodiment, the reordering rule may be based on a preset cost. For example, the reordering rule may determine an ascending (or descending) order of specific cost. For example, the preset cost may represent a template matching cost. Hereinafter, a template matching method according to an embodiment of the present invention will be described with reference to FIG. 26.

Figure 26:
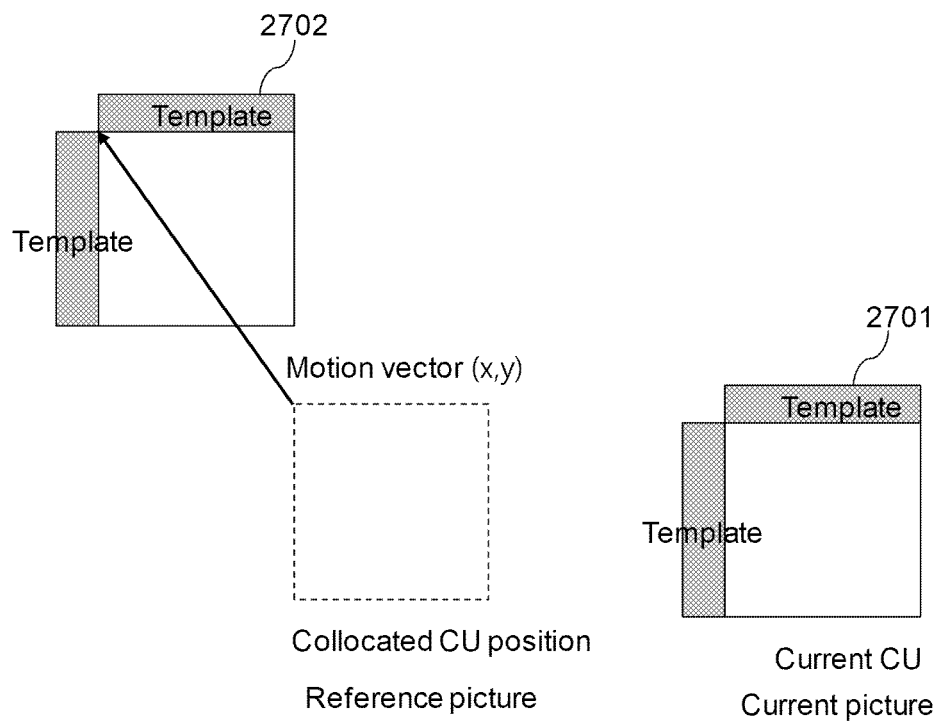
FIG. 26 is a diagram illustrating a template matching method according to an embodiment of the present invention.

FIG. 26 is a diagram illustrating a template matching method according to an embodiment of the present invention. According to an embodiment, template matching may be an operation of comparing the template of a first block and the template of a second block. That is, the encoder and the decoder may determine the value difference between the first block and the second block through comparison between the template of the first block and the template of the second block. This is because a specific block and the template of the block can be presumed to have at least a preset level of similarity. For example, the encoder and the decoder may perform template matching on the basis of a sample value difference between templates of a plurality of blocks.

According to an embodiment of the present invention, the template of a specific block may be a region of a range and location configured in advance on the basis of the block or may be samples in the region. For example, the template of a specific block may be configured with neighboring samples adjacent to a boundary of the block. In detail, the template of the current block may be configured with neighboring samples adjacent to a boundary of the current block. Furthermore, the template of a comparison target block to be compared with the current block may be configured with neighboring samples adjacent to a boundary of the comparison target block. Furthermore, a template may be determined in a region in which samples reconstructed earlier than the current block are present.

The above-described template matching cost may be a sum of differences between values of samples corresponding to the same location in each of a plurality of templates. In this case, templates are determined to be more similar as the sum decreases. That is, the decoder may determine that templates match better as the sum decreases. Furthermore, the template matching cost may reduce as the sum decreases. Furthermore, the template matching may be performed on the basis of a square or absolute value of a difference between values of samples corresponding to the same location in each of a plurality of templates. The template matching may be an operation of searching for a candidate block corresponding to a template having a minimum value difference with the template of the current block among candidate blocks in order to detect a block similar to the current block. For example, when a plurality of candidate blocks are present, as the template matching cost between the template of the current block and the candidate blocks decreases, the likelihood of the corresponding candidate blocks being selected as a merge or MVP target block may increase. Furthermore, as the template matching cost decreases, an index of a candidate list may be set to a smaller value. For example, the candidate list may be reordered such that a candidate having a lower template matching cost, among a plurality of candidate blocks included in the candidate list, has a smaller index.

Referring to FIG. 26, the template of the current block may be configured with upper adjacent samples and left adjacent samples of the current block. However, the present disclosure is not limited thereto, and the template of the current block may be configured in a different way according to at least one of block scan order, decoding order, or whether neighboring samples of the current block are available. According to an embodiment, the template of the current block may be compared with the template of a comparison target block. In FIG. 26, a comparison target block of the current block may be a block indicated by a motion vector of a co-located block located in a reference picture of the current block. In this case, a template 2701 of the current block and a template 2702 of the comparison target block may be compared. Furthermore, the decoder may determine the value difference between the current block and the comparison target block on the basis of a comparison result. The decoder may reorder the candidate list or may determine a target block on the basis of the value difference between the current block and the comparison target block.

According to an embodiment of the present invention, the MCR may be applied to all of the inter-prediction methods or motion vector obtaining method described in the present disclosure. For example, the MCR may be applied to at least one of a merge mode, pattern-matched motion vector refinement (PMVR), or MVP mode. The encoder and the decoder according to an embodiment of the present invention may obtain a motion information set by selecting a candidate indicated by a specific index from the candidate list reordered through the above-described MCR. Here, a candidate having a smaller index in the candidate list may be signaled through a fewer number of bits. Therefore, a candidate having a higher likelihood of being selected may be arranged to correspond to a smaller index in the candidate list.

FIG. 27 is a diagram illustrating whether signs match and sign determination according to an embodiment of the present invention. According to an embodiment of the present invention, the encoder may not explicitly signal a sign bit indicating sign information of a specific value. In this case, the decoder may estimate the sign information on the basis of signaled other information. In this manner, the signaling overhead may be reduced when the sign information is not signaled through an additional bit. For example, the encoder may not explicitly signal sign information of a motion vector or a motion vector difference value. Furthermore, the decoder may estimate the sign information of a motion vector or a motion vector difference value on the basis of signaled information.

According to a specific embodiment, when the decoder estimates sign information including n number of sign bits, the number of pieces of possible sign information is 2^n. According to an embodiment of the present invention, the encoder and the decoder may configure a sign information list including pieces of possible sign information according to a rule predefined between the encoder and the decoder. The sign information list may include a plurality of pieces of candidate sign information. For example, as illustrated in FIG. 27, when two signs are estimated, the sign information list may include four pieces of candidate sign information.

According to an embodiment, the encoder may signal any one of pieces of candidate sign information included in the sign information list. According to another embodiment, the encoder may signal modification information indicating a method by which each piece of candidate sign information is modified on the basis of reference sign information. In detail, the modification information may indicate 'Hit' when the reference sign information is not modified, indicate 'Vertical flip' for the case of vertical modification in which the sign of a y-axis component is modified, indicate 'Horizontal flip' for the case of horizontal modification in which the sign of an x-axis component is modified, and indicate 'Diagonal flip' for the case of diagonal modification in which the signs of an x-axis component and y-axis component are modified, but the present disclosure is not limited thereto. For example, when the number of sign bits to be estimated is at least three, another modification method may be added.

Referring to FIG. 27, the reference sign information may be candidate sign information having a lowest preset cost among the pieces of candidate sign information included in the sign information list. The encoder and the decoder may determine the candidate sign information having a lowest preset cost on the basis of a predefined rule. The preset cost may be the template matching cost described above with reference to FIG. 26.

In detail, the decoder may obtain modification information '10' indicating a modification method from the encoder. In this case, the decoder may determine reference sign information that is a reference among the pieces of candidate sign information. That is, the decoder may determine the reference sign information corresponding to Hit among the pieces of candidate sign information. For example, the decoder may use, as the reference sign information, candidate sign information having a lowest template matching cost among the pieces of candidate sign information. Next, the decoder may select candidate sign information that was vertically flipped (10) from the reference sign information. According to an embodiment, when the above-described sign information indicates the sign of the motion vector difference value of the current block, the sign information may include signs for an x-axis component and y-axis component of the coordinate (x, y) defining a motion vector. In this case, the decoder may reconstruct the current block by using the selected candidate sign information as the sign information of the motion vector difference value.

Although FIG. 27 illustrates that the sign information list is configured in order of vertical modification, horizontal modification, and diagonal modification, the present disclosure is not limited thereto. For example, the sign information list may be configured so that the horizontal modification is signaled by a fewer number of bits than that of the vertical modification.

Furthermore, information indicating each of the plurality of modification methods may be signaled through at least one bit. Here, the number of bits signaled to indicate a modification method may be variable. Sign information having a higher likelihood of being selected from the sign information list may be signaled through a fewer number of bits. For example, the modification method may be encoded using at least one of truncated unary binarization, unary binarization, or exp-Golomb binarization.

According to an additional embodiment, information indicating the modification method may be encoded on the basis of context. In this manner, the signaling overhead may be reduced. For example, in FIG. 27, information corresponding to a specific modification method may be signaled through 2 bits, and information indicating the modification methods other than the specific modification method may be signaled through 3 bits. Here, the information to be signaled through 2 bits may be determined on the basis of context. Hereinafter, a method of encoding information indicating a modification method on the basis of context will be described with reference to FIGS. 28 and 29.

FIG. 28 and FIG. 29 are diagrams illustrating a method of encoding sign information in consideration of context according to an embodiment of the present invention. In the embodiments of FIGS. 28 and 29, information indicating a method of modification from reference sign information may be signaled through variable-length bits. According to an embodiment of the present invention, modification information indicating a method of modification from reference sign information may be determined on the basis of an absolute value of an x-axis component and an absolute value of a y-axis component. For example, when estimated sign information is sign information for the motion vector difference value of the current block, the modification information may be determined on the basis of the absolute value of the x-axis component and the absolute value of the y-axis component of the motion vector difference value.

Referring to FIG. 28, the modification information for modifying the sign of the smaller value among the absolute value of the x-axis component and the absolute value of the y-axis component may be signaled through a fewer number of bits. This is because flipping the sign of the smaller value among the absolute value of the x-axis component and the absolute value of the y-axis component may provide a short distance to a value before sign modification. As the distance decreases, a cost value difference may reduce. In detail, the distance between the location (x, y) and the location (–x, y) may be a first distance, and the distance between the location (x, y) and the location (x, –y) may be a second distance. Here, when the absolute value of y is smaller than the absolute value of x, the second distance may be shorter than the first distance. In this case, the modification information that modifies the sign of the y-axis component from the reference sign information may be signaled through a fewer number of bits compared to the modification information that modifies the sign of the x-axis component.

Although FIG. 28 illustrates the case of |x|<|y| and the case of |x|>=|y| to provide descriptions, the method of signaling the modification information may vary according to the case of |x|<=|y| and the case of |x|>|y|. Alternatively, when |x| and |y| are not equal, the flip of FIG. 10, which considers an absolute value, may be performed, and, when |x| and |y| are equal, the modification information may be signaled according to a preset method. Here, the preset method may be the method described with reference to FIG. 27. According to an additional embodiment, a reordering process that considers an absolute value may be added to the above-described candidate list MCR process.

Furthermore, referring to FIG. 28, the modification information (diagonal flip) that flips both the signs of x-axis component and y-axis component may be signaled by '110'. Furthermore, the modification information (large absolute value flip) that does not flip the sign of a component having a smaller absolute value may be signaled by '111'. That is, 'diagonal flip' may be signaled through a smaller value than that for 'large absolute value flip'. Meanwhile, referring to FIG. 29, 'diagonal flip' may be signaled by '111', and 'large absolute value flip' may be signaled by '110'.

As in FIG. 27, the above-described sign information may be information indicating the sign of the motion vector or the motion vector difference value of the current block. When the above-described sign information indicates the sign of the motion vector difference value of the current block, the sign information may include signs for an x-axis component and y-axis component of the coordinate (x, y) defining a motion vector. According to an embodiment, the decoder may determine reference sign information corresponding to Hit on the basis of the template matching cost. For example, the decoder may use, as the reference sign information, candidate sign information having a lowest template matching cost among the pieces of candidate sign information. Next, the decoder may compare the absolute value of the x-axis component and the absolute value of the y-axis component of the motion vector difference value of the current block. The decoder may obtain a modification method on the basis of a comparison result and signaled modification information. Next, the decoder may obtain final sign information to be applied to the absolute value of the motion vector difference value of the current block on the basis of the obtained modification method and the reference sign information. Furthermore, the decoder may generate a final motion vector difference value by applying the obtained final sign information to the absolute value of the motion vector difference value. The decoder may reconstruct the current block on the basis of the final motion vector difference value.

In the above-described embodiment, a method of estimating 2-bit sign information is exemplarily described, but the present disclosure is not limited thereto. The above-described sign information estimating and signaling method may be equally or equivalently applied to the case of estimating sign information including more than two sign bits. For example, when estimating n number of signs, the modification information may be signaled on the basis of absolute values respectively corresponding to n number of signs. For example, as the absolute value of a component decreases, the modification information that flips the sign of the component may be signaled through a fewer number of bits.

Meanwhile, according to an embodiment of the present invention, the current block may be divided into a plurality of regions, to which different motion information sets are applied, so as to be predicted. Here, the current block may be divided on the basis of boundary information. For example, the decoder may detect an edge in the current block. The decoder may detect the edge in the current block using a gradient-based sobel operator. Next, the decoder may obtain the boundary information on the basis of the detected edge. Here, the current block may be divided into at least two regions on the basis of the detected edge. The decoder may divide, on the basis of the boundary information, the current block into at least two regions in which different motion information sets are used. Hereinafter, a method of performing, on the basis of different motion information sets, inter-prediction on each of regions divided from a current block according to an embodiment of the present invention will be described.

Figure 30:
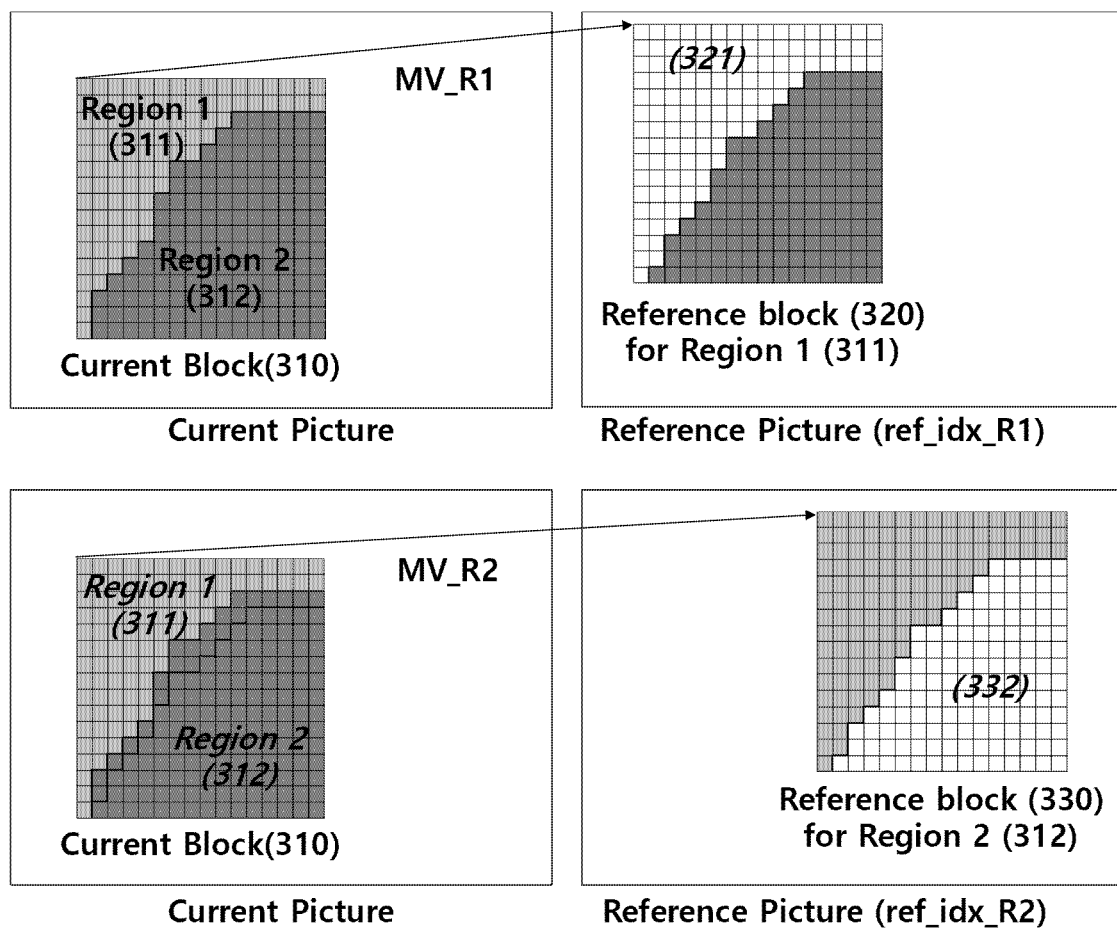
FIG. 30 is a diagram illustrating a method of performing, on the basis of different motion information sets, prediction on each of regions divided from a current block according to an embodiment of the present invention.

FIG. 30 is a diagram illustrating a method of performing, on the basis of different motion information sets, prediction on each of regions divided from a current block according to an embodiment of the present invention. Referring to FIG. 30, a current block 310 may be divided into a first region 311 and a second region 312 on the basis of boundary information of the current block 310. The motion information set corresponding to the first region 311 may include a motion vector and reference picture index indicating a first reference block 320 including a region similar to the first region 311 of the current block 310. That is, a first motion information set may be obtained on the basis of an original sample value of the first region 311 of the current block 310 and a sample value of a first partial region 321 corresponding to the first region in the first reference block 320. SAD or SATD may be calculated on the basis of the original sample value of the first region 311 of the current block 310 and the sample value corresponding to the first partial region 321. Furthermore, the first motion information set of the first region 311 of the current block 310 may be expressed as {MV_R1, ref_idx_R1}.

Likewise, the above-described embodiment may be applied to the second region 312 of the current block 310. For example, a second motion information set may be obtained on the basis of an original sample value of the second region 312 of the current block 310 and a sample value of a second partial region 332 corresponding to the second region in a second reference block 330. The second motion information set corresponding to the second region 312 may be expressed as {MV_R2, ref_idx_R2}. A reference picture index for the first region 311 and a reference picture index for the second region 312 may be the same.

The decoder according to an embodiment of the present invention may obtain a final prediction block of the current block on the basis of the first motion information set and the second motion information set, obtained through the above-described method. For example, the decoder may generate a first prediction block for the first region 311 on the basis of the first motion information set. Furthermore, the decoder may generate a second prediction block for the second region 312 on the basis of the second motion information set.

Next, the decoder may generate the final prediction block for the current block by combining the first prediction block and the second prediction block. For example, the decoder may generate the first prediction block having a sample value of '0' corresponding to a region except for the first partial region 321. Furthermore, the decoder may generate the second prediction block having a sample value of '0' corresponding to a region except for the second partial region 321. In this case, the final prediction block may be expressed as a sum of the first prediction block and the second prediction block. In addition, the decoder may generate the first prediction block and the second prediction block using boundary information. The encoder and the decoder may generate the boundary information according to a predefined rule. Here, pieces of the boundary information generated by the encoder and the decoder respectively may be the same. Furthermore, the decoder may generate a prediction block which is the same as a prediction block predicted by the encoder on the basis of the boundary information.

According to an additional embodiment, the decoder may perform vertical/horizontal filtering on samples around a boundary between the first region 311 and the second region 312. Here, the samples around the boundary may be adjacent to the boundary. Furthermore, the decoder may perform the filtering using a low-pass filter which passes a lower frequency band than a reference frequency. Furthermore, the decoder may perform the filtering using a low-band 3-tap filter. Filter factors of the low-band 3-tap filter may be {¼, ²⁄₄, ¼}.

Figure 31:
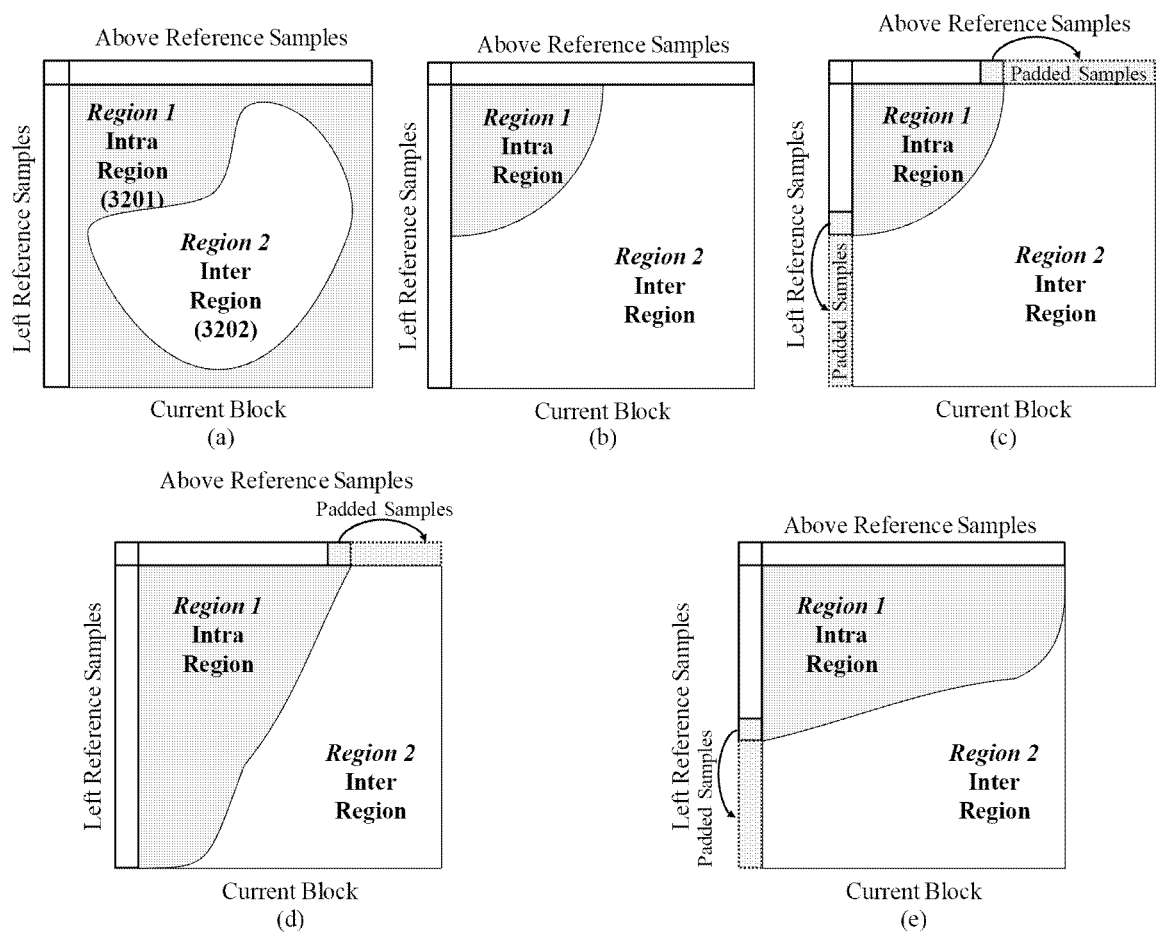
FIG. 31 is a diagram illustrating a method of performing intra-prediction or inter-prediction on each of regions divided from a current block according to an embodiment of the present invention.

Meanwhile, when the current block is divided into a plurality of regions as in FIG. 30, some of the plurality of regions may be intra-predicted, and the other regions may be inter-predicted. FIG. 31 is a diagram illustrating a method of performing intra-prediction or inter-prediction on each of regions divided from a current block according to an embodiment of the present invention. As in the embodiment of FIG. 30, the current block may be divided on the basis of boundary information. For example, the current block may be divided into a first region 3201 and a second region 3202 on the basis of the boundary information.

In a specific embodiment, the first region 3201 may be encoded according to an intra-prediction method, and the second region 3202 may be encoded using an inter-prediction method. In this case, the decoder may obtain the motion information set corresponding to the second region 3203, and may generate a second prediction block corresponding to the second region 3202 on the basis of the corresponding motion information set {MV_R2, ref_idx_R2}.

Furthermore, the decoder may generate a first prediction block corresponding to the first region 3201 on the basis of left or upper reference samples of the current block. The decoder may generate the first prediction block on the basis of an intra-prediction mode of the current block. Here, the infra-prediction mode for predicting the first region 3201 in the encoder may be determined through the following equation.

$$cost(i) = SATD + \lambda \cdot bit(i)$$

$$SATD = \Sigma_{x \in R2} \Sigma_{y \in R1} [H(Org(x,y) - Pred1(x,y))] \quad \text{[Equation 7]}$$

In [Equation 7], SATD may be a value obtained by Hadamard-transforming a residual signal between the current block and the first prediction block. That is, SATD denotes the difference between a prediction signal and an original signal corresponding to the first region. bit(i) denotes the number of bits required for encoding an ith intra-prediction mode, and λ may be a parameter for adjusting a unit between a residual signal and an encoding rate. The encoder may signal an intra-prediction mode that minimizes cost(i) of [Equation 7]. Furthermore, the decoder may generate the first prediction block for the first region 3201 using a parsed intra-prediction mode.

Next, the decoder may generate the final prediction block for the current block by combining the first prediction block and the second prediction block. The decoder may combine the first prediction block and the second prediction block on the basis of boundary information. Here, in the first prediction block, a sample value of a region except for the first region 3201 may be set to '0'. Furthermore, in the second prediction block, a sample value of a region except for the second region 3202 may be set to '0'. In this case, the final prediction block may be expressed as a sum of the first prediction block and the second prediction block.

FIG. 31(a) illustrates a method of performing intra-prediction on a first region when a boundary between the first region and a second region forms a closed curve according to an embodiment of the present invention. When the current block has a width of W and a height of H, the decoder may perform intra-prediction using up to 2*W+2*H+1 number of reconstructed samples that are present around the current block.

FIG. 31(b) illustrates a method of performing intra-prediction on a first region when a boundary between the first region and a second region crosses the current block in an arbitrary form according to an embodiment of the present invention. As in FIG. 31(a), the decoder may perform intra-prediction using up to 2*W+2*H+1 number of reconstructed samples that are present around the current block.

FIGS. 31(c) to 31(e) illustrate a method of performing intra-prediction on a first region on the basis of padded reference samples when a boundary between the first region and a second region crosses the current block in an arbitrary form according to an embodiment of the present invention. For example, when the first region and the second region are images showing different objects in the current block, it may be efficient to use only portions contiguous to the first region, among neighboring samples of the current block.

In FIG. 31(c), a point at which a boundary in the current block meets an upper boundary of the current block and a point at which the boundary in the current block meets a left boundary of the current block may be (x', 0) and (0, y') respectively. Here, the decoder may perform reference sample padding in a right direction on the basis of a reconstructed sample of the location (x', −1). The decoder may configure upper reference samples using padded samples on the right side of (x', −1) and (x'+1) number of reconstructed samples. Furthermore, the decoder may perform reference sample padding in a downward direction on the basis of a reconstructed sample of the location (−1, y'). The decoder may configure left reference samples using padded samples below (−1, y') and (y'+1) number of reconstructed samples.

FIG. 31(d) illustrates that the boundary in the current block meets the upper boundary of the current block, but does not meet the left boundary thereof. Here, a point at which the boundary between the first region and the second region meets the upper boundary of the current block may be (x", 0). The decoder may perform reference sample padding in a right direction on the basis of a reconstructed sample of the location (x", −1). The decoder may configure upper reference samples using right-side padded samples from (x", −1) and (x"+1) number of reconstructed samples. Furthermore, existing reconstructed samples may be used as left reference samples.

FIG. 31(e) illustrates that the boundary in the current block meets the left boundary of the current block but does not meet the upper boundary thereof. Here, a point at which the boundary between the first region and the second region meets the left boundary of the current block may be (0, y"). The decoder may perform reference sample padding in a downward direction on the basis of a reconstructed sample of the location (−1, y"). The decoder may configure left reference samples using lower padded samples from (−1, y') and (y"+1) number of reconstructed samples. Furthermore, existing reconstructed samples may be used as upper reference samples.

The above-described embodiments of the present invention can be implemented through various means. For example, embodiments of the present invention may be implemented by hardware, firmware, software, or a combination thereof.

For implementation by hardware, the method according to embodiments of the present invention may be implemented by one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and the like.

In the case of implementation by firmware or software, the method according to embodiments of the present invention may be implemented in the form of a module, procedure, or function that performs the functions or operations described above. The software code can be stored in memory and driven by a processor. The memory may be located inside or outside the processor, and may exchange data with the processor by various means already known.

The above-mentioned description of the present invention is for illustrative purposes only, and it will be understood that those of ordinary skill in the art to which the present invention belongs may make changes to the present invention without altering the technical ideas or essential characteristics of the present invention and the invention may be easily modified in other specific forms. Therefore, the embodiments described above are illustrative and are not restricted in all aspects. For example, each component described as a single entity may be distributed and implemented, and likewise, components described as being distributed may also be implemented in an associated fashion.

The scope of the present invention is defined by the appended claims rather than the above detailed description, and all changes or modifications derived from the meaning and range of the appended claims and equivalents thereof are to be interpreted as being included within the scope of present invention.

What is claimed is:

1. A video signal decoding device comprising:
a processor,
wherein the processor is configured to:
obtain a first motion vector of a current block corresponding to a first reference picture and a second motion vector of the current block corresponding to a second reference picture,
obtain a first picture order count (POC) difference representing a POC difference between the first reference picture and a current picture,
obtain a second POC difference representing a POC difference between the second reference picture and the current picture,
obtain at least one of a first correction value of the first motion vector and a second correction value of the second motion vector as a first value, based on a result of comparing the first POC difference and the second POC difference, wherein the first value is a specific offset,
obtain a first corrected motion vector by correcting the first motion vector based on the first correction value,
obtain a second corrected motion vector by correcting the second motion vector based on the second correction value, and
reconstruct the current block based on the first corrected motion vector and the second corrected motion vector,
wherein the first reference picture and the second reference picture are included in a first reference picture list and a second reference picture list, respectively, and
wherein the first reference picture list and the second reference picture are different from each other.

2. The video signal decoding device of claim 1,
wherein the first reference picture list is used in a first higher level region in which up to one motion vector is used for a specific sample and a second higher level region in which up to two motion vectors are used for the specific sample, and
wherein the second reference picture list is not used in the first higher level region.

3. The video signal decoding device of claim 1,
wherein when one of the first correction value and the second correction value is obtained as the first value,
a correction value obtained as the first value is obtained earlier than a correction value not obtained as the first value.

4. The video signal decoding device of claim 3,
wherein when an absolute value of the first POC difference is greater than or equal to an absolute value of the second POC difference, the first correction value is obtained as the first value, and
wherein when the absolute value of the first POC difference is less than the absolute value of the second POC difference, the second correction value is obtained as the first value.

5. The video signal decoding device of claim 4,
wherein when the absolute value of the first POC difference is greater than or equal to the absolute value of the second POC difference,
the first corrected motion vector is obtained by adding the first value to the first motion vector,
the second corrected motion vector is obtained by adding a second value to the second motion vector, and
the second value is obtained based on the first value.

6. The video signal decoding device of claim 1,
wherein a value representing the first reference picture list is 0 and a value representing the second reference picture list is 1.

7. A video signal encoding device comprising:
a processor,
wherein the processor is configured to
obtain a bitstream to be decoded by a decoder using a decoding method,
wherein the decoding method comprising:
obtaining a first motion vector of a current block corresponding to a first reference picture and a second motion vector of the current block corresponding to a second reference picture;
obtaining a first picture order count (POC) difference representing a POC difference between the first reference picture and a current picture;
obtaining a second POC difference representing a POC difference between the second reference picture and the current picture;
obtaining at least one of a first correction value of the first motion vector and a second correction value of the second motion vector as a first value, based on a result of comparing the first POC difference and the second POC difference, wherein the first value is equal to a specific offset;
obtaining a first corrected motion vector by correcting the first motion vector based on the first correction value;
obtaining a second corrected motion vector by correcting the second motion vector based on the second correction value; and
reconstructing the current block based on the first corrected motion vector and the second corrected motion vector,
wherein the first reference picture and the second reference picture are included in a first reference picture list and a second reference picture list, respectively, and
wherein the first reference picture list and the second reference picture are different from each other.

8. The video signal encoding device of claim 7,
wherein the first reference picture list is used in a first higher level region in which up to one motion vector is used for a specific sample and a second higher level region in which up to two motion vectors are used for the specific sample, and
wherein the second reference picture list is not used in the first higher level region.

9. The video signal encoding device of claim 7,
wherein when one of the first correction value and the second correction value is obtained as the first value,
a correction value obtained as the first value is obtained earlier than a correction value not obtained as the first value.

10. The video signal encoding device of claim 9,
wherein when an absolute value of the first POC difference is greater than or equal to an absolute value of the second POC difference, the first correction value is obtained as the first value, and
wherein when the absolute value of the first POC difference is less than the absolute value of the second POC difference, the second correction value is obtained as the first value.

11. The video signal encoding device of claim 10,
wherein when the absolute value of the first POC difference is greater than or equal to the absolute value of the second POC difference,
the first corrected motion vector is obtained by adding the first value to the first motion vector,
the second corrected motion vector is obtained by adding a second value to the second motion vector, and
the second value is obtained based on the first value.

12. The video signal encoding device of claim 7,
wherein a value representing the first reference picture list is 0 and a value representing the second reference picture list is 1.

13. A non-transitory computer-readable medium storing a bitstream, the bitstream being decoded by a decoding method,
wherein the decoding method, comprising:
obtaining a first motion vector of a current block corresponding to a first reference picture and a second motion vector of the current block corresponding to a second reference picture;
obtaining a first picture order count (POC) difference representing a POC difference between the first reference picture and a current picture;
obtaining a second POC difference representing a POC difference between the second reference picture and the current picture;
obtaining at least one of a first correction value of the first motion vector and a second correction value of the second motion vector as a first value, based on a result of comparing the first POC difference and the second POC difference, wherein the first value is a specific offset;
obtaining a first corrected motion vector by correcting the first motion vector based on the first correction value;
obtaining a second corrected motion vector by correcting the second motion vector based on the second correction value; and
reconstructing the current block based on the first corrected motion vector and the second corrected motion vector,
wherein the first reference picture and the second reference picture are included in a first reference picture list and a second reference picture list, respectively, and
wherein the first reference picture list and the second reference picture are different from each other.

14. The non-transitory computer-readable medium storing a bitstream of claim 13,
wherein the first reference picture list is used in a first higher level region in which up to one motion vector is used for a specific sample and a second higher level region in which up to two motion vectors are used for the specific sample, and
wherein the second reference picture list is not used in the first higher level region.

15. The non-transitory computer-readable medium storing a bitstream of claim 13,
wherein when one of the first correction value and the second correction value is obtained as the first value,
a correction value obtained as the first value is obtained earlier than a correction value not obtained as the first value.

16. The non-transitory computer-readable medium storing a bitstream of claim 15,
wherein when an absolute value of the first POC difference is greater than or equal to an absolute value of the second POC difference, the first correction value is obtained as the first value, and wherein when the absolute value of the first POC difference is less than the absolute value of the second POC difference, the second correction value is obtained as the first value.

17. The non-transitory computer-readable medium storing a bitstream of claim 16,
wherein when the absolute value of the first POC difference is greater than or equal to the absolute value of the second POC difference,
the first corrected motion vector is obtained by adding the first value to the first motion vector,
the second corrected motion vector is obtained by adding a second value to the second motion vector, and
the second value is obtained based on the first value.

18. A video signal processing method, the method comprising:
obtaining a first motion vector of a current block corresponding to a first reference picture and a second motion vector of the current block corresponding to a second reference picture;
obtaining a first picture order count (POC) difference representing a POC difference between the first reference picture and a current picture;
obtaining a second POC difference representing a POC difference between the second reference picture and the current picture;
obtaining at least one of a first correction value of the first motion vector and a second correction value of the second motion vector as a first value, based on a result of comparing the first POC difference and the second POC difference, wherein the first value is a specific offset;
obtaining a first corrected motion vector by correcting the first motion vector based on the first correction value;
obtaining a second corrected motion vector by correcting the second motion vector based on the second correction value; and
reconstructing the current block based on the first corrected motion vector and the second corrected motion vector,
wherein the first reference picture and the second reference picture are included in a first reference picture list and a second reference picture list, respectively, and
wherein the first reference picture list and the second reference picture are different from each other.

* * * * *